US011887488B2

(12) United States Patent
Kreiner et al.

(10) Patent No.: US 11,887,488 B2
(45) Date of Patent: *Jan. 30, 2024

(54) COMPUTER AIDED DISPATCH OF DRONES

(71) Applicants: AT&T Intellectual Property I, L.P., Atlanta, GA (US); AT&T Mobility II LLC, Atlanta, GA (US)

(72) Inventors: Barrett M. Kreiner, Woodstock, GA (US); Thomas Rozanski, III, Old Lyme, CT (US); Mark Radice, Medina Township, OH (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/646,383

(22) Filed: Dec. 29, 2021

(65) Prior Publication Data

US 2022/0122473 A1 Apr. 21, 2022

Related U.S. Application Data

(63) Continuation of application No. 16/430,775, filed on Jun. 4, 2019, now Pat. No. 11,244,573, which is a (Continued)

(51) Int. Cl.
*G08G 5/00* (2006.01)
*B64C 39/02* (2023.01)
(Continued)

(52) U.S. Cl.
CPC ......... *G08G 5/0043* (2013.01); *B64C 39/024* (2013.01); *G06Q 10/00* (2013.01);
(Continued)

(58) Field of Classification Search
CPC .. G08G 5/0043; G08G 5/0013; G08G 5/0034; G08G 5/0069; G08G 5/0082;
(Continued)

(56) References Cited

U.S. PATENT DOCUMENTS 6,134,500 A 10/2000 Tang et al.
6,999,876 B2 2/2006 Lambert et al.
(Continued)

OTHER PUBLICATIONS

Non-Final Office Action received for U.S. Appl. No. 14/954,595 dated Jun. 5, 2017, 48 pages.
(Continued)

*Primary Examiner* — Nadeem Odeh
(74) *Attorney, Agent, or Firm* — Guntin & Gust, PLC; Robert Gingher

(57) ABSTRACT

Dispatch of drones is disclosed. Example drone dispatching methods include transmitting a flight plan for a drone to a flight control platform associated with first operator for piloting the drone. The flight plan is based on a first location associated with a service request. In response to receiving a message from the flight control platform, a first communication session between the flight control platform and a flight control unit of the drone is initiated to permit remote piloting of the drone. A drone observation platform associated with a second operator is selected based on a subject matter qualification associated with the second operator and descriptive information included in the service request. A second communication session between the flight control platform and the drone observation platform is initiated for remote piloting of the drone.

20 Claims, 13 Drawing Sheets

Related U.S. Application Data continuation of application No. 14/954,595, filed on Nov. 30, 2015, now Pat. No. 10,319,243.

(51) Int. Cl.
| | |
|---|---|
| *G06Q 10/00* | (2023.01) |
| *G06Q 10/10* | (2023.01) |
| *B64U 10/13* | (2023.01) |
| *B64U 70/00* | (2023.01) |

(52) U.S. Cl.
CPC ........... *G06Q 10/10* (2013.01); *G08G 5/0013* (2013.01); *G08G 5/0034* (2013.01); *G08G 5/0069* (2013.01); *G08G 5/0082* (2013.01); *B64U 10/13* (2023.01); *B64U 70/00* (2023.01); *B64U 2201/00* (2023.01)

(58) Field of Classification Search
CPC ...... B64C 39/024; G06Q 10/00; G06Q 10/10; B64U 10/13; B64U 70/00; B64U 2201/00
See application file for complete search history.

(56) References Cited

U.S. PATENT DOCUMENTS

| | | | |
|---|---|---|---|
| 7,245,216 | B2 | 7/2007 | Burkley et al. |
| 7,451,023 | B2 | 11/2008 | Appleby et al. |
| 7,509,212 | B2 | 3/2009 | Bodin et al. |
| 7,693,624 | B2 | 4/2010 | Duggan et al. |
| 7,937,068 | B2 | 5/2011 | Hogberg et al. |
| 8,515,609 | B2 | 8/2013 | McAndrew et al. |
| 8,751,061 | B2 | 6/2014 | Coulmeau et al. |
| 8,849,476 | B2 | 9/2014 | Coulmeau |
| 8,929,851 | B2 | 1/2015 | Mills et al. |
| 8,948,935 | B1 | 2/2015 | Peeters et al. |
| 8,983,682 | B1 | 3/2015 | Peeters et al. |
| 9,002,384 | B1 | 4/2015 | Hallenbeck |
| 9,051,043 | B1 | 6/2015 | Peeters et al. |
| 9,061,102 | B2 | 6/2015 | Levien et al. |
| 9,064,222 | B2 | 6/2015 | Saad et al. |
| 9,087,451 | B1 | 7/2015 | Jarrell |
| 9,489,852 | B1 | 11/2016 | Chambers et al. |
| 10,319,243 | B2 * | 6/2019 | Kreiner .................. G06Q 10/00 |
| 11,244,573 | B2 * | 2/2022 | Kreiner ................ G08G 5/0034 |
| 2008/0125933 | A1 | 5/2008 | Williams et al. |
| 2009/0265193 | A1 | 10/2009 | Collins et al. |
| 2010/0159976 | A1 | 6/2010 | Marocchi et al. |
| 2010/0250022 | A1 | 9/2010 | Hines et al. |
| 2011/0130636 | A1 | 6/2011 | Daniel et al. |
| 2012/0143482 | A1 | 6/2012 | Goossen et al. |
| 2012/0175468 | A1 | 7/2012 | Zero |
| 2014/0142785 | A1 | 5/2014 | Fuentes et al. |
| 2014/0222248 | A1 | 8/2014 | Levien et al. |
| 2014/0222250 | A1 | 8/2014 | Khazan et al. |
| 2015/0063202 | A1 | 3/2015 | Mazzarella et al. |
| 2015/0148988 | A1 | 5/2015 | Fleck |
| 2015/0346722 | A1 | 12/2015 | Herz et al. |
| 2016/0370800 | A1 | 12/2016 | Chau et al. |
| 2017/0011339 | A1 * | 1/2017 | Buford ............... G06Q 10/0835 |

OTHER PUBLICATIONS

Final Office Action received for U.S. Appl. No. 14/954,595 dated Apr. 10, 2018, 67 pages.

Non-Final Office Action received for U.S. Appl. No. 14/954,595 dated Aug. 31, 2018, 38 pages.

Lawrence, James D., "Local Area Drone Dispatch and Authorization System (LADDAS)," Kick Starter, kicstarter.com, <hltps://www.kickstarter.com/projects/42193299/loca 1-area-drone-d ispatchand-authorization-system>, dated Sep. 28, 2015 (8 pages).

Policeone Staff, "Security app flies drones to your location in emergency," PoliceOne.com, <http://www.policeone.com/police-products/police-technology/Emergency-Response/articles/7830668-Security-app-flies-drones-to-your-location-in-emergency/>, dated Nov. 17, 2014 (1 page).

Starr, Michelle, "Ambulance drone unveiled in Netherlands," EMS1 .com, ems1 .com,<http://www.ems1.com/technology/articles/2011247-Ambulance-drone-unveiledin-Netherlands/>, dated Oct. 29, 2014 (1 page).

Roberts, Mary Rose, "5 drone technologies for EMS: The commercialization of unmanned aerial aircrafts is leading to innovative, off-the-shelf tools for EMS," EMS1 .com,<hltps://www.ems1.com/ems-products/cameras-video/articles/1882799-5-dronetechnologies-for-EMS/>, dated Apr. 10, 2014 (3 pages).

Fly 4 Me, "The Future of On Demand Drones Is Here", <http://fty4me/>, last retrieved on Sep. 17, 2015 (7 pages).

Fung, Brian, "The FAA's drone rules won't require a pilot's license, after all", The Washington Post, Feb. 15, 2015 (2 pages).

Gofor, "Gofor: Drones on Demand", <http://gofordrones.com>, last retrieved on Sep. 17, 2015 (5 pages).

Dillow, Clay, "As commercial drove use soars, 'drone services' take flight", Fortune.com, Jul. 17, 2015 (4 pages).

Notice of Allowance received for U.S. Appl. No. 16/430,775 dated Sep. 29, 2021, 39 pages.

* cited by examiner

COMPUTER AIDED DISPATCH OF DRONES

RELATED APPLICATIONS

The present application is a continuation of, and claims priority to each of, U.S. patent application Ser. No. 16/430,775, filed Jun. 4, 2019, and entitled "Computer Aided Dispatch of Drones," which is a continuation of U.S. patent application Ser. No. 14/954,595 (now U.S. Pat. No. 10,319,243), filed Nov. 30, 2015, and entitled "Computer Aided Dispatch of Drones," which applications are hereby incorporated by reference in their respective entireties.

TECHNICAL FIELD

This disclosure relates generally to drones and, more particularly, to computer aided dispatch of drones.

BACKGROUND

Drones, such as unmanned aerial vehicles (UAVs), are mobile platforms capable of acquiring (e.g., sensing) information, delivering materials, manipulating objects, etc., in many operating scenarios. For example, drones can travel quickly, and without the physical limitations of ground based transport, to locations that are remote, dangerous, unable to be reached by human personnel, etc., or any combination thereof. Upon reaching such locations, drones can provide many benefits, such as acquiring sensor data (e.g., audio, image, video and/or other sensor data) at a target location, delivering materials (e.g., medical supplies, food supplies, engineering materials, etc.) to the target location, manipulating objects (e.g., such as retrieving objects, operating equipment, etc.) at the target location, etc. However, drone operation, such as drone piloting over extended distances, may require a pilot with special training. Furthermore, in some scenarios, drone operation may be restricted to a certified pilot who has submitted a flight plan to a relevant governmental agency and/or other appropriate organization.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
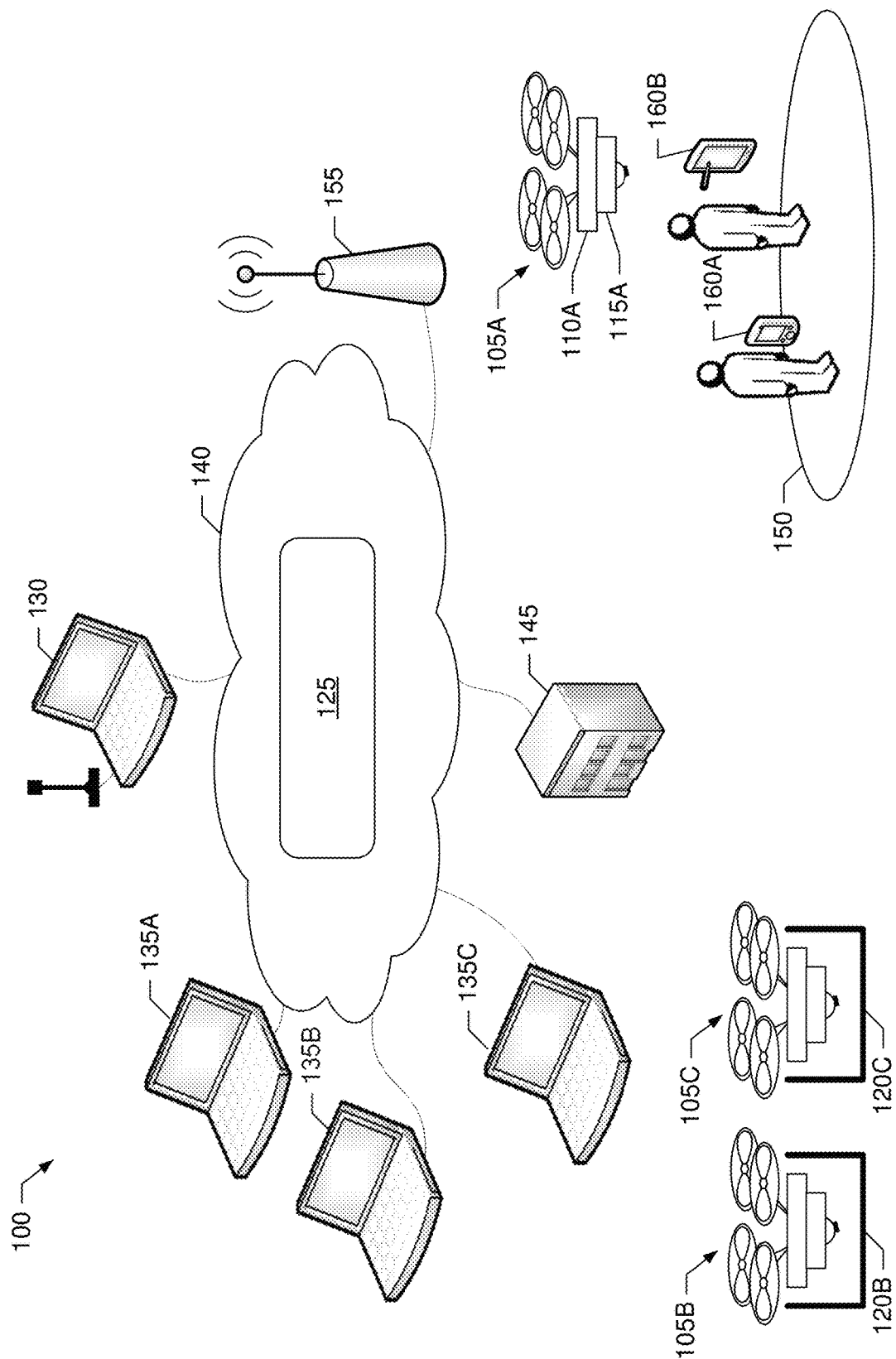
FIG. 1 is a block diagram of an example drone operations system supporting computer-aided dispatch of drones in accordance with the teachings of this disclosure.

Methods, apparatus, systems and articles of manufacture (e.g., physical storage media) to implement computer aided dispatch of drones are disclosed herein. Example drone dispatching methods disclosed herein include transmitting a flight plan for a drone to a flight control platform (e.g., associated with a drone pilot). In some examples, the flight plan is based on a first location associated with a service request. Disclosed example methods also include, in response to receiving a message from the flight control platform indicating the flight plan is approved, initiating a first communication session (e.g., a piloting communications session, as described in further detail below) between the flight control platform and a flight control unit of the drone to permit remote piloting of the drone. Disclosed example methods further include, in response to receiving the message from the flight control platform indicating the flight plan is approved, initiating a second communication session (e.g., a conferencing communication session, as described in further detail below) to exchange communication session data, such as multimedia data, between the flight control platform and a drone observation platform (e.g., associated with a subject matter expert), with the drone observation platform being separate from the flight control platform.

Some disclosed example methods further include initiating a third communication session (e.g., an observation communication session, as disclosed in further detail below) between the drone observation platform and a payload unit of the drone. In some such examples, the third communication session is to convey sensor data from the payload unit to the drone observation platform, and is to further convey control data from the drone observation platform to the payload unit to control operation of the payload unit. Some such disclosed example methods also include blocking data from being exchanged between the drone observation platform and the flight control unit of the drone via the third communication session to prevent the remote piloting of the drone via the drone observation platform. Some such disclosed example methods further include activating the blocking of data from being exchanged between the drone observation platform and the flight control unit of the drone via the third communication session in response to a command (e.g., an override command) received from the flight control platform.

Additionally, or alternatively, some disclosed example methods further include adding another communication device to the second communication session to exchange at least a portion of the multimedia among the flight control platform, drone observation platform and the communication device.

Additionally, or alternatively, in some disclosed example methods, the multimedia data exchanged between the flight control platform and the drone observation platform via the second communication session includes voice data exchanged between the flight control platform and the drone observation platform, and graphical data transmitted from the flight control platform to the drone observation platform. In some such examples, the graphical data is based on sensor data received by the flight control platform from a payload unit of the drone via the first communication session.

Additionally, or alternatively, in some disclosed examples, the drone is a first drone included in a fleet of drones and the first drone is located at a second location. Some such disclosed example methods further include receiving the service request from a computer aided dispatch system, with the service request identifying the first location and including descriptive information. Some such disclosed example methods also include selecting the first drone from the fleet of drones based on the descriptive information and a distance between the first location and the second location, and invoking a mapping application to determine the flight plan to route the first drone from the second location to the first location. In examples in which the drone observation platform is a first drone observation platform from among multiple different observation platforms (e.g., associated with different subject matter experts), some such disclosed example methods further include selecting the first drone observation from the multiple different observation platforms based on the descriptive information included in the service request.

Additionally, or alternatively, some such disclosed example methods further include, in response to receiving the message from the flight control platform indicating the flight plan is approved, transmitting the flight plan to a computing platform associated with a governmental agency.

These and other example methods, apparatus, systems and articles of manufacture (e.g., physical storage media) to implement computer aided dispatch of drones are disclosed in greater detail below.

Drones, such as UAVs, have the capability to provide many benefits in many different possible scenarios. As noted above, drones have the potential to acquire sensor data (e.g., audio, image, video and/or other sensor data), deliver materials (e.g., medical supplies, food supplies, engineering materials, etc.), manipulate objects (e.g., such as retrieving objects, operating equipment, etc.), etc., in locations that are remote, dangerous, unable to be reached by human personnel, etc. However, in at least some scenarios, drone operation may be restricted to a pilot with special training, or even a certified pilot who has submitted a flight plan to a relevant governmental agency and/or other appropriate organization. For example, some jurisdictions may require drones being flown outside a small operational window (e.g., a small area, such as a Wi-Fi region or Wi-Fi bubble) to be flown by a pilot certified by a governmental agency (such as the Federal Aviation Administration (FAA) in the United States) or some other appropriate regulating body, and under a flight plan submitted to the agency before drone operations begin.

Currently, in emergency response and other time critical situations, the logistics associated with contacting a certified pilot and submitting a flight plan may not be able to be completed within the desired response time window (e.g., such as five (5) minutes for emergency response scenarios), or the cost of completing such logistics within the desired response time window may be prohibitive. Furthermore, finding a drone pilot who also has the subject matter expertise appropriate for the actual situation (such as a pilot who is also a firefighter, a pilot who is also a police officer, a pilot who is also a network technician, etc.) is rare, further limiting the viability of using drones for time-critical response scenarios.

Example methods, apparatus, systems and articles of manufacture (e.g., physical storage media) disclosed herein provide technical solutions to the technical problems associated with using drones in time-critical response scenarios by providing platforms to integrate drone management with computer aided dispatch systems. Example drone deployment systems implementing computer aided dispatch of drones in accordance with the teachings of this disclosure utilize one or more communication networks and/or services to implement (i) a drone piloting plane to permit remote piloting of drones, (ii) a drone management plane to support drone selection, configuration, flight plan creation, etc., and (iii) a drone interaction plane to allow one or more subject matter experts and/or on-scene personnel to view and/or interact with drone sensor feeds, interact with the drone pilot, interact among each other, etc. Some example drone deployment systems disclosed herein implement the drone pilot plane, the drone management plane and the drone interaction plane as parallel processes that are invoked in response to a service request to dispatch resources received from a computer aided dispatch system, such as a request to dispatch emergency personnel.

For example, an example drone deployment system implementing computer aided dispatch of drones in accordance with the teachings of this disclosure responds to a service request from a computer aided dispatch platform by invoking the drone management plane to select a drone from a fleet of available drones based on a target location and descriptive information provided in the service request. The example drone management plane also prepares a flight plan for the drone based on the target location provided in the service request and capability information specified for the selected drone. The example drone management plane further transmits the flight plan to a flight control platform associated with a pilot (who may be selected from a group of available pilots) to obtain approval of the flight plan.

In some examples, in response to a message from the flight control platform indicating approval of the flight plan, the drone management plane electronically submits the approved flight plan to the appropriate governmental agency and/or regulating body. Additionally, the example drone deployment system invokes the drone piloting plane to initiate a piloting communication session between the pilot's flight control platform and the selected drone to enable remote piloting of the drone by the selected pilot. Furthermore, in some examples, the drone deployment system invokes the drone interaction plane (e.g., in parallel with invocation of the drone piloting plan) to initiate a conferencing communication session between the flight control platform of the selected pilot and a drone observation platform of a subject matter expert (who may be selected from a group of available subject matter experts based on descriptive information included in the service request). The conferencing communication session permits multimedia data, such as voice and/or video data, to be exchanged between the subject matter expert and the drone pilot in real-time, such that the subject matter expert can direct the pilot's operation of the drone. Furthermore, in some examples, the conferencing communication session can permit multimedia data, such as graphical data generated by the flight control platform from sensor data (e.g., video data, temperature data, etc.) received from the drone, to be transmitted from the flight control platform to the drone observation platform. In some examples, the drone deployment system monitors the conferencing communication session to, for example, add communication device(s) to the conferencing communication session to permit on-site personnel to communicate with the subject matter expert and/or the drone pilot.

In some examples, the drone interaction plane also initiates an observation communication session between the drone observation platform of a subject matter expert and the selected drone to permit the drone observation platform to, for example, receive sensor data from the drone. Additionally, or alternatively, the observation communication session may permit the drone observation platform to transmit control data to the drone to control operation of, for example, sensor(s) and/or other equipment (e.g., tools, object manipulators, etc.) carried by the drone. In some examples, the drone deployment system blocks (e.g., permanently, selectively, etc.) flight control data from being exchanged between the drone observation platform and the drone to prevent the drone observation platform from being used to remotely pilot the drone.

Through the foregoing drone deployment mechanisms, example drone deployment systems disclosed herein do not rely on drone pilots having the requisite subject matter expertise for a given scenario. Instead, disclosed example drone deployment systems permit drone pilots to be paired with personnel having the requisite subject matter expertise in real-time and potentially at different locations. Furthermore, disclosed example drone deployment systems handle logistics, such as drone selection, pilot selection, subject matter expert selection, flight plan generation and submission, etc., automatically and electronically in a time-efficient manner, thereby allowing response times to be met in time critical scenarios.

Turning to the figures, a block diagram of an example drone deployment system 100 implementing computer-aided dispatch of drones in accordance with the teachings of this disclosure is illustrated in FIG. 1. The example drone deployment system 100 includes a fleet of one or more example drones 105A-C. Respective ones of the example drones 105A-C may be implemented by, for example, any type of drone, such as an unmanned aerial vehicle (UAV), etc., and/or other vehicular device, such as an unmanned vehicular device, a robotic device, etc., that is a ground vehicle, a water craft, etc. In the illustrated example of FIG. 1, the drones 105A-C are depicted as UAVs and include respective flight control units and payload units. For example, the drone 105A includes an example flight control unit 110A and an example payload unit 115A.

In the illustrated example, the example flight control unit 110A includes any appropriate avionics, control actuators, and/or other equipment to fly the drone 105A, and one or more communication transceivers to receive flight control commands from and transmit feedback and/or other sensor data to one or more remote platforms to permit remote piloting of the drone 105A. The payload unit 115A of the illustrated example includes one or more sensors, such as one or more cameras and/or other imaging sensor, one or more microphones and/or other acoustic sensors, one or more environmental sensors (e.g., such as one or more temperature sensors, pressure sensors, humidity sensors, gas sensors, etc.), etc., or any combination thereof. Additionally, or alternatively, the example payload unit 115A includes equipment, such as one or more tools, actuators, manipulators, etc., capable of manipulating (e.g., touching, grasping, delivering, measuring, etc.) objects. The payload unit 115A further includes one or more communication transceivers to transmit sensor data to one or more remote platforms, and/or receive payload control commands from one or more remote platforms to permit remote operation of the payload equipment.

In some examples, the flight control unit 110A and the payload unit 115A of the example drone 105A share the same communication transceiver(s). In some examples, the flight control unit 110A and the payload unit 115A of the example drone 105A additionally or alternatively include separate communication transceiver(s). The example communication transceiver(s) of the flight control unit 110A and/or the payload unit 115A of the drone 105A can be implemented by any type(s), number(s) and/or combination(s) of communication transceivers. For example, the example communication transceiver(s) of the flight control unit 110A and/or the payload unit 115A of the drone 105A can be implemented by one or more transceivers supporting one or more third generation (3G) and/or fourth generation (4G) mobile cellular communication standards, and/or one or more transceivers supporting Wi-Fi communications, satellite communications, ultra-low frequency (ULF) communications, etc., or any combination thereof.

The example drone deployment system 100 of FIG. 1 also includes example docking stations 120B-C for the example drones 105A-C. For example, two such example docking stations 120B-C are illustrated in the example of FIG. 1. The example docking stations 120B-C are structured to recharge and/or otherwise support the drones 105A-C.

To implement computer aided dispatch of drones in accordance with the teachings of this disclosure, the example drone deployment system 100 includes (i) an example drone operations manager 125 in communication with the drones 105A-C, (ii) one or more flight control platforms, such as an example flight control platform 130, and (iii) one or more drone observation platforms, such as an example drone observation platforms 135A-C. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

As disclosed in further detail below, the drone operations manager 125 dispatches drones in response to service requests received from requestors, such as an example computer aided dispatch system 145, via the example network 140. The example computer aided dispatch system 145 can be implemented by any type(s) and/or number of dispatch systems associated with, for example, an emergency services dispatch system, a network maintenance dispatch system, etc. In the illustrated example of FIG. 1, in response to a service request received from the computer aided dispatch system 145, the drone operations manager 125 processes information included in the request to select a drone, such as the example drone 105A, from the fleet of drones to support the request. The drone operations manager 125 also selects, based on information included in the request, a flight control platform, such as the flight control platform 130, associated with a pilot, and a drone observation platform, such as the drone observation platform 135A, associated with a subject matter expert (SME). The drone operations manager 125 further determines a flight plan for piloting the selected drone 105A to an example target location 150 identified in the service request.

As disclosed in further detail below, the drone operations manager 125 dispatches drones in response to service requests received from requestors, such as an example computer aided dispatch system 145, via the example network 140. The example computer aided dispatch system 145 can be implemented by any type(s) and/or number of dispatch systems associated with, for example, an emergency services dispatch system, a network maintenance dispatch system, etc. In the illustrated example of FIG. 1, in response to a service request received from the computer aided dispatch system 145, the drone operations manager 125 processes information included in the request to select a drone, such as the example drone 105A, from the fleet of drones to support the request. The drone operations manager 125 also selects, based on information included in the request, a flight control platform, such as the flight control platform 130, associated with a pilot, and a drone observation platform, such as the drone observation platform 135A, associated with a SME. The drone operations manager 125 further determines a flight plan for piloting the selected drone 105A to an example target location 150 identified in the service request.

After determining the flight plan, the drone operations manager 125 transmits the flight plan via the example network 140 to the selected flight control platform 130 to obtain approval of the flight plan. In response to a reply message received from the flight control platform 130 approving the flight plan, the drone operations manager 125 initiates a first communication session between the selected flight control platform 130 and the selected drone 105A to permit the drone to be remotely piloted by the flight control platform 130. For example, the network 140 may include an example wireless network 155, such as a 3G/4G mobile carrier network, a Wi-Fi network, a satellite network, etc., or any combination thereof, capable of exchanging data with the communication transceiver(s) of the drone 105A.

In the illustrated example of FIG. 1, in response to the reply message received from the flight control platform 130 approving the flight plan, the drone operations manager 125 also initiates a second communication session between the selected flight control platform 130 and the selected drone observation platform 135A via the network 140 to permit multimedia data (e.g., such as voice data, video data, text data, etc.) to be exchanged between the flight control platform 130 and the drone operations manager 125. In some examples, the drone operations manager 125 also permits one or more communication devices, such as the example communications devices 160A-B illustrated in FIG. 1, associated with one or more personnel, such as on-site personnel at the target location 150, to be added to the second communication session.

In the illustrated example of FIG. 1, in response to the reply message received from the flight control platform 130 approving the flight plan, the drone operations manager 125 further initiates a third communication session between the selected drone observation platform 135A and the selected drone 105A to permit the drone observation platform 135A to access the payload unit 115A of the drone 105A. For example, the third communication session can permit the drone observation platform 135A to receive sensor data from the payload unit 115A and/or transmit commands to control the sensor(s) and/or other equipment included in the payload unit 115A. In some examples, the third communications session allows the drone observation platform 135A to remotely pilot the drone 105A. In some such examples, the drone observation platform 135A operates as a secondary piloting platform, which is subordinate to and can be overridden by commands from the selected flight control platform 130 (which, therefore, operates as a primary piloting platform).

In some examples, the drone operations manager 125 of FIG. 1 configures the deployed drone 105A to perform one or more autonomous (or semi-autonomous) protection routines while traveling to and/or operating at the target location 150. For example, the drone operations manager 125 may configure the drone 105A to perform an object avoidance procedure to avoid objects, such as power lines, structures, interior walls, animals, people, etc., if the drone 105A is equipped with one or more sensors capable of detecting objects, such as one or more radar sensors, ultrasonic sensors, inductance sensors, etc. Additionally, or alternatively, the drone operations manager 125 may configure the drone 105A to perform a hazard avoidance procedure to avoid hazards, such a fire, smoke, water, etc., if the drone 105A is equipped with one or more sensors capable of detecting hazards, such as one or more thermal sensors, smoke sensors, acoustic sensors, etc. Additionally, or alternatively, the drone operations manager 125 may configure the drone 105A to perform a personnel protection procedure, which causes the drone 105A to vary its position randomly when operating at the target location 150 to protect the locations of personnel from being detected (e.g., tagged) due to drone operation.

Figure 2:
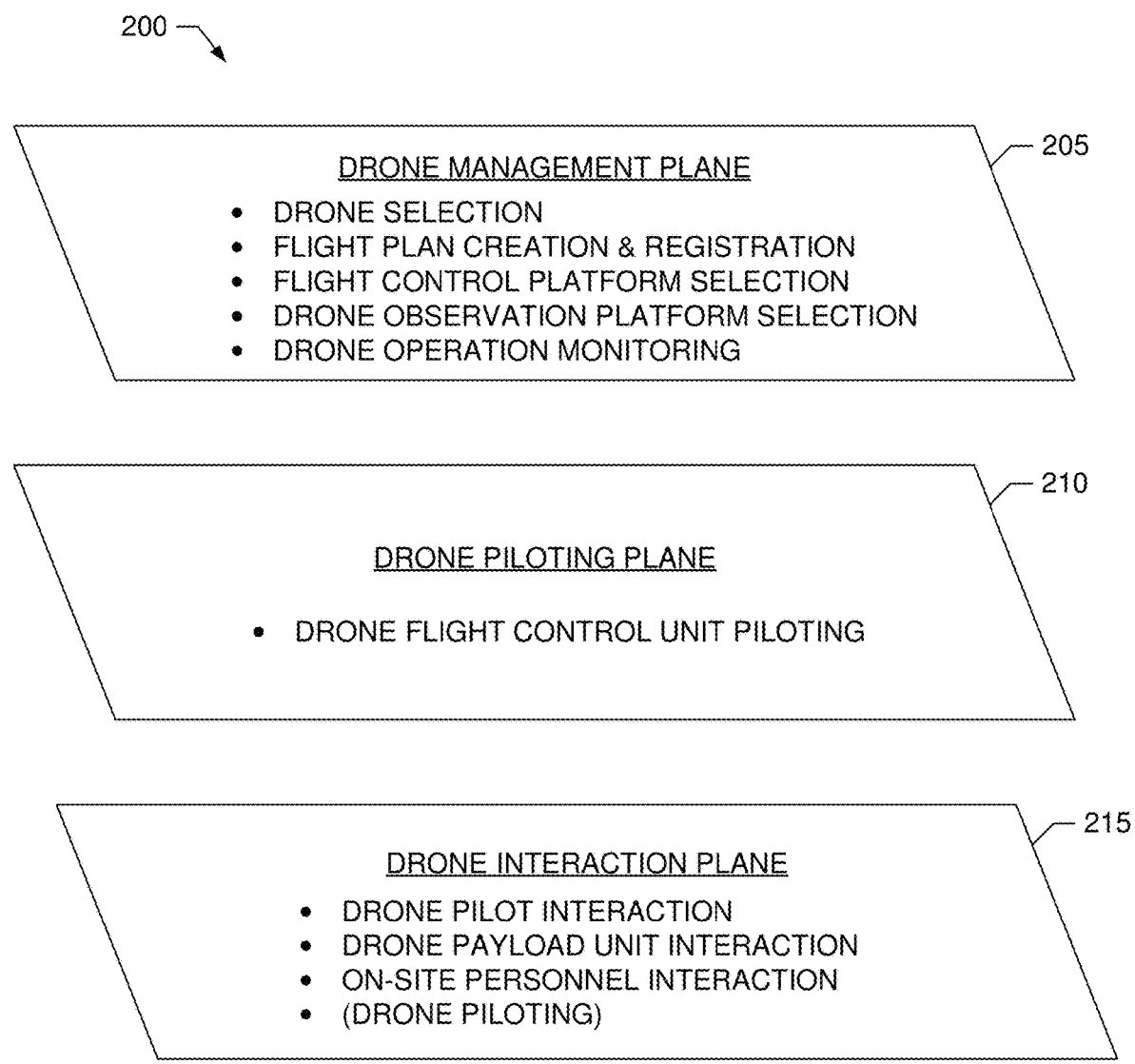
FIG. 2 illustrates example drone processing planes supported by the example drone operations system of FIG. 1.

The example drone operations manager 125 of FIG. 1 implements multiple processing planes to perform the example operations described above and in further detail below to provide computer aided dispatch of drones in accordance with the teachings of this disclosure. Example processing planes 200 implemented by the example drone operations manager 125 of FIG. 1 are illustrated in FIG. 2. With reference to FIG. 2, the example processing planes implemented by the example drone operations manager 125 of FIG. 1 include an example drone management plane 205, an example drone piloting plane 210 and an example drone interaction plane 215. As illustrated in FIG. 2, the example drone management plane 205 includes processing to perform drone selection, flight plan creation and registration, flight control platform selection, drone observation platform selection, drone operation monitoring, etc. The example drone piloting plane 210 includes processing to permit a pilot associated with a flight control platform (e.g., such as the example flight control platform 130) to remotely pilot the flight control units of the example drones 105A-C (e.g., such as the example flight control unit 110A of the example drone 105A). The example drone interaction plane 215 includes processing to permit interaction(s) between the flight control platform of the drone pilot and one or more drone observation platforms (e.g., such as the example drone observation platforms 135A-C) associated with one or more subject matter experts (SMEs). In some examples, the example drone interaction plane 215 also permits interaction(s) between the drone observation platforms of the SME(s) and the payload units of the example drones 105A-C (e.g., such as the example payload unit 115A of the example drone 105A). In some examples, the example drone interaction plane 215 additionally or alternatively permits interaction(s) between communication device(s) (e.g., such as the example communication devices 160A-B) associated with on-site personnel and the drone observation platforms associated with the SMEs and/or the flight control platform associated with the drone pilot. Furthermore, in some examples, the drone interaction plane 215 permits secondary remote piloting of the flight control units of the example drones 105A-C from the drone observation platforms (e.g., with primary remote piloting being performed by the flight control platform associated with the drone pilot).

Figure 3:
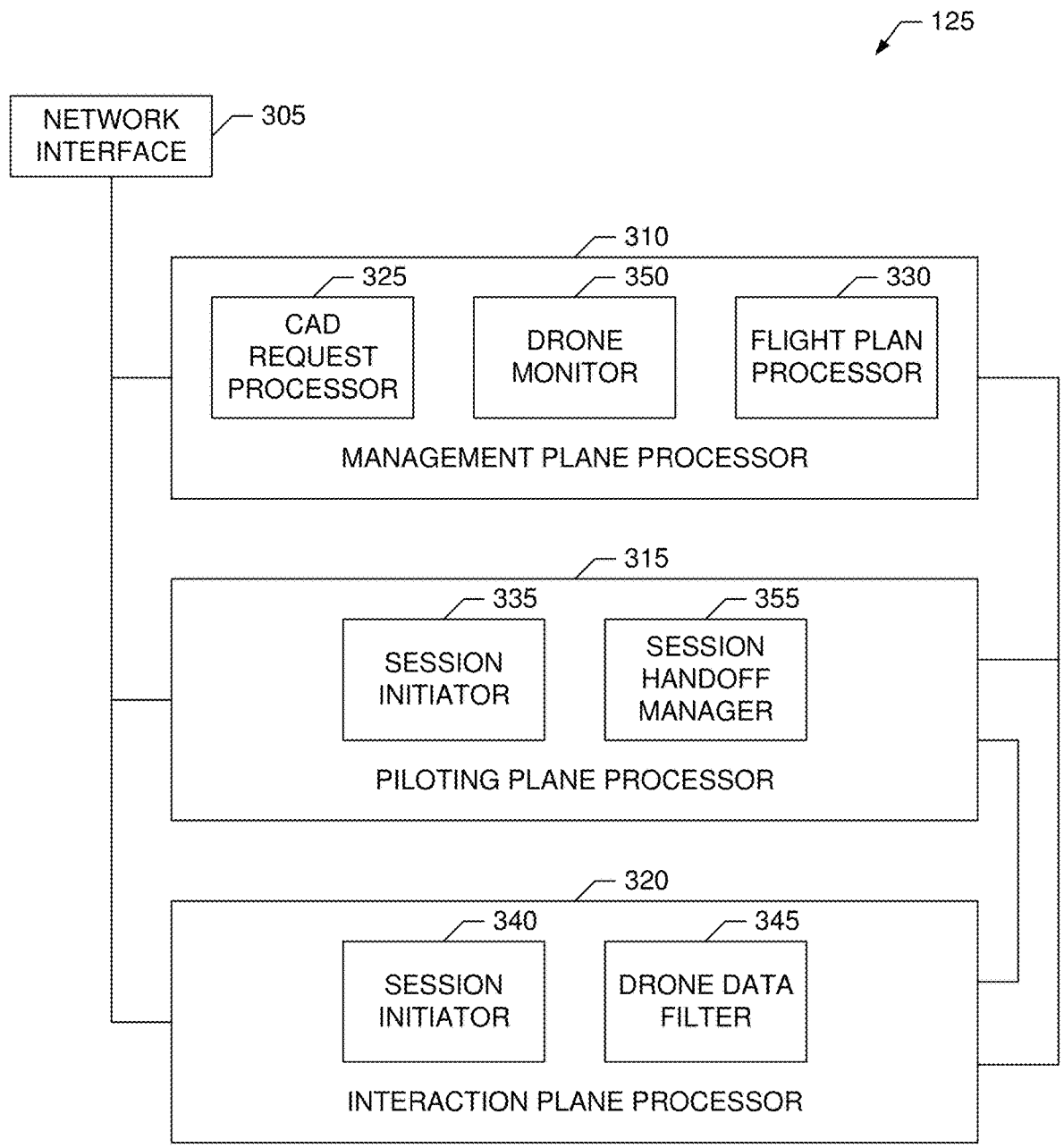
FIG. 3 is a block diagram of an example drone operations manager that may be used to implement the example drone operations system of FIG. 1.

With reference to the example processing planes illustrated in FIG. 2, the example drone operations manager 125 of FIG. 3 includes an example network interface 305 to communicate with one or more communication networks, links, etc., such as the example network 140 of FIG. 1. The example network interface 305 can be implemented by any type(s), number(s) and/or combination(s) of interfaces, such as the example interface circuit 1120 of FIG. 11, which is described in further detail below. In the illustrated example of FIG. 3, the network interface 305 receives service requests from computer aided dispatch (CAD)p systems, such as the example CAD system 145 of FIG. 1, via the network 140. For example, once the example CAD system 145 identifies a target location, such as the example target location 150, to which a drone is to be dispatched, the CAD system 145 sends a service request including information identifying the target location to the drone operations manager 125 via the network 140, which is received by the example network interface 305.

With reference to the example processing planes illustrated in FIG. 2, the example drone operations manager 125 of FIG. 3 includes an example network interface 305 to communicate with one or more communication networks, links, etc., such as the example network 140 of FIG. 1. The example network interface 305 can be implemented by any type(s), number(s) and/or combination(s) of interfaces, such as the example interface circuit 1120 of FIG. 11, which is described in further detail below. In the illustrated example of FIG. 3, the network interface 305 receives service requests from CAD systems, such as the example CAD system 145 of FIG. 1, via the network 140. For example, once the example CAD system 145 identifies a target location, such as the example target location 150, to which a drone is to be dispatched, the CAD system 145 sends a service request including information identifying the target location to the drone operations manager 125 via the network 140, which is received by the example network interface 305.

The example drone operations manager 125 of FIG. 3 also includes an example management plane processor 310, an example piloting plane processor 315 and an example interaction plane processor 320 to implement the example drone management plane 205, the example drone piloting plane 210 and the example drone interaction plane 215, respectively, of FIG. 2 in the example drone deployment system 100 of FIG. 1. In the illustrated example of FIG. 3, the management plane processor 310 of the example drone operations manager 125 includes an example CAD request processor 325 to process service requests received from CAD systems, such as the example CAD system 145 of FIG. 1. For example, in response to a service request received from the CAD system 145, the drone operations manager 125 invokes the CAD request processor 325 of the management plane processor 310 to review the inventory of available drones 105A-C, calculate respective distances and/or travel times for the different drones 105A-C from their respective staging locations (e.g., such as the locations of the example docking stations 120B-C) to the target location 150 (e.g., by invoking one or more automated mapping applications), and retrieve the operational capabilities (e.g., operational range and duration, etc.) of the different drones 105A-C. The CAD request processor 325 then evaluates the calculated distances, travel times and/or operational capabilities to select one or more of the drones to support the service request from the CAD system 145 (or none if no drones are available). For example, the CAD request processor 325 may select one of the available drones 105A-C that has the lowest calculated travel time and/or distance to the target location 150, and/or that has a calculated travel time that satisfies (e.g., is within) a first threshold window of time (e.g., 5 minutes or some other time window), and that has an operational range and duration to travel to the target location 150 and remain there for at least a second threshold window of time (e.g., 30 minutes, 1 hour, or some other window of time).

In some examples, the service request received from the CAD system 145 also includes descriptive information specifying the type of service request. For example, such descriptive information for an emergency services request may specify whether the service request is for a medical emergency, a structural fire, a forest fire, a natural disaster, etc. As another example, descriptive information included in a maintenance service request may specify whether the request is for structural/equipment monitoring, material delivery, remote exploration, etc. In some such examples, the operational capabilities retrieved by the CAD request processor 325 for the different drones 105A-C may also include drone configuration information specifying the payload unit characteristics of the different drones. For example, such drone configuration information may specify the available sensors, such as camera types, audio capability, etc., supported by the different drones 105A-C, the available object manipulation equipment, such as tools, actuators, etc., carried by the different drones 105A-C, etc. In some such examples, the CAD request processor 325 further evaluates the drone configuration information for the different drones 105A-C, along with evaluating the calculated distances, travel times and/or other operational capabilities determined for the different drones 105A-C, to select one or more of the drones 105A-C to support the service request received from the CAD system 145. For example, the CAD request processor 325 may perform a first selection procedure to select one or more of the drones 105A-C having payload unit characteristics capable of supporting the type of service request to be included in a candidate subset of drones. The CAD request processor 325 may then perform a second selection procedure to select, based on calculated distances and/or travel times as described above, one or more of the drones 105A-C included in the candidate subset of drones to support the service request.

The example management plane processor 310 of the example drone operations manager 125 of FIG. 3 also includes an example flight plan processor 330 to determine flight plan(s) for the drone(s) selected by the CAD request processor 325 to support the service request received from the CAD system 145. For example, assuming the CAD request processor 325 selects the drone 105A to support the service request, the flight plan processor 330 invokes one or more automated mapping applications to determine a flight plan to convey the drone 105A from its staging location to the target location 150. The example flight plan processor 330 further transmits (e.g., via the network interface 305 and the network 140) the determined flight plan to a flight control platform, such as the flight control platform 130, of the drone pilot who is to pilot the selected drone 105A, to request approval of the flight plan. In some examples, the CAD request processor 325 also selects an available drone pilot (or an available flight control platform associated with an available drone pilot) to support the service request received from the CAD system 145. For example, the CAD request processor 325 may perform round-robin selection to select the next available pilot/flight control platform from a list, and/or may compare pilot/flight control platform qualifications to the descriptive information included in the service request to select an appropriate pilot/flight control platform to support the request.

Assume the example CAD request processor 325 selected the flight control platform 130 to support the service request. Then, in reply to transmitting the flight plan to the selected flight control platform 130, the flight plan processor 330 receives a reply message (e.g., via the network interface 305 and the network 140) from the selected flight control platform 130 indicating whether the flight plan is approved. In some examples, if the flight plan is not approved, the flight plan processor 330 determines another flight plan for the selected drone 105A (e.g., by varying one or more parameters/preferences used by the automating mapping application(s) to determine the flight plan). However, if the flight plan is approved, in some examples the example flight plan processor 330 transmits (e.g., via the network interface 305 and the network 140) the approved flight plan electronically (e.g., as a data file) to the appropriate government agency (e.g., the FAA) and/or other regulating body, organization, etc.

In the illustrated example of FIG. 3, the piloting plane processor 315 of the example drone operations manager 125 implements the example drone piloting plane 210 to permit the selected pilot to remotely control operation of the selected drone (e.g., the drone 105A) via the selected flight control platform (e.g., the flight control platform 130). For example, assume the drone 105A and the flight control platform 130 have been selected by the CAD request processor 325 of the management plane processor 310 to support the service request received from the CAD system 145. In the illustrated example of FIG. 3, and with reference to FIG. 4, the piloting plane processor 315 of FIG. 3 includes an example session initiator 335 to initiate an example piloting communication session 405 between the selected flight control platform 130 and the flight control unit 110A of the selected drone 105A in response to the drone operations manager 125 receiving a message from the flight control platform 130 indicating approval of the flight plan. In some examples, the piloting communication session 405 is implemented by a virtual private network (VPN) session in a wide area (e.g., mobile cellular and/or Wi-Fi) network, such as the example network 155, (or a combination of a wide area network and a broadband/telecommunications network) capable of maintaining network communication between the drone 105A and the flight control platform 130 as the drone is piloted to and operated at the target location 150. The piloting communication session 405 of the illustrated example supports two-way communications to allow the pilot to enter flight control commands and receive appropriate flight control feedback data (and/or other sensor data) at the flight control platform 130.

In some examples, the piloting communication session 405 may further provide access to other sensors included in the flight control unit 110A and/or the example payload unit 115A of the drone 105A. For example, the piloting communication session 405 may permit the flight control platform 130 to receive sensor data from one or more drone sensors, such as cameras, microphones, etc., to permit the pilot to visualize and/or otherwise sense operation of the drone 105A as the drone is flown to and operated at the target location 105. Furthermore, in some examples, the piloting communication session 405 permits control commands to be sent by the flight control platform 130 to the drone 105A to permit remote control of sensors and/or other equipment carried by the drone 105A.

In some examples, the piloting communication session 405 is initiated by the session initiator 335 of the example piloting plane processor 315 prior to deployment of the drone 105A to permit the pilot to fly the drone 105A from its staging location to the target location 150. In some examples, such as when the drone 105A is able to fly autonomously to one or more checkpoints included in the flight plan, the piloting communication session 405 may be initiated by the session initiator 335 after the drone 105A is initially deployed and while the drone 105A is flying to the target location 150 (but before the pilot is to take control of the drone 105A at the appropriate checkpoint), which may help reduce the overall time involved in deploying the drone 105A to the target location 150.

In the example drone operations manager 125 of FIG. 3, the CAD request processor 325 of the management plane processor 310 also selects one or more available SMEs (or one or more available drone observation platforms associated with the one or more available SMEs) to support the service request received from the CAD system 145. In some examples, the CAD request selects the SME(s)/drone observation platforms(s) to support the service request in response to the drone operations manager 125 receiving the reply message from the flight control platform 130 indicating approval of the flight plan. For example, the CAD request processor 325 may perform round-robin selection to select the next available SME/drone observation platform from a list, and/or may compare SME/drone observation platform qualifications to the descriptive information included in the service request to select an appropriate SME/drone observation platform to support the request.

In the illustrated example of FIG. 3, the interaction plane processor 320 of the example drone operations manager 125 implements the example drone interaction plane 215 to permit the selected SME to interact with the selected drone pilot and with at least the payload unit of the selected drone (e.g., the drone 105A) via the selected drone observation platform (e.g., the drone observation platform 135A). For example, assume the drone 105A, the flight control platform 130 and the drone observation platform 135A have been selected by the CAD request processor 325 of the management plane processor 310 to support the service request received from the CAD system 145. In the illustrated example of FIG. 3, and with reference to FIG. 4, the interaction plane processor 320 of FIG. 3 includes an example session initiator 340 to initiate, via the example network 140, an example conferencing communication session 410 between the selected drone observation platform 135A and the selected flight control platform 130, which may be remotely located from each other, in response to the drone operations manager 125 receiving the reply message from the flight control platform 130 indicating approval of the flight plan. In some examples, the conferencing communication session 410 permits multimedia data, such as voice and/or video data, to be exchanged between the drone observation platform 135A and the selected flight control platform 130 to enable the selected SME to interact with the selected drone pilot in real-time, such that the subject matter expert can direct the pilot's operation of the drone. For example, the conferencing communication session 410 may be implemented by a video teleconferencing session, an audio teleconferencing session, etc. In some examples, the conferencing communication session 410 is maintained as a separate communication session from the piloting communication session 405 to keep remote control of the drone secure.

In some examples, the conferencing communication session 410 permits graphical data and/or other data determined by the selected flight control platform 130 (e.g., from sensor data received from the drone 105A) to be transmitted to the selected drone observation platform 135A. For example, the conferencing communication session 410 may permit screen sharing such that graphical data generated by the flight control platform 130 from sensor data (e.g., video data, temperature data, etc.) received from the drone 105A can be shared with the drone observation platform 135A.

In some examples, in response to the drone operations manager 125 receiving the reply message from the flight control platform 130 indicating approval of the flight plan, the session initiator 340 of the example interaction plane processor 320 also initiates an example observation communication session 415 between the selected drone observation platform 135A and the payload unit 115A of the selected drone 105A. In the illustrated example of FIG. 4, the observation communication session 415 is implemented by a data session (which may be a secure VPN session, an unsecure data session, etc.) in a wide area (e.g., mobile cellular and/or Wi-Fi) network, such as the example network 155, (or a combination of a wide area network and a broadband/telecommunications network) capable of maintaining network communication between the drone 105A and the drone observation platform 135A as the drone is operated at the target location 150. The observation communication session 415 of the illustrated example allows the selected drone observation platform 135A of the SME to interface with the payload unit 115A of the drone 105A to, for example, access and/or control one or more capabilities of the drone, such as one or more sensors (e.g., cameras, microphones, gas detection sensors, temperature sensors, etc.), robotic arms, etc., other than the flight control aspects of the drone 105A. For example, the observation communication session 415 permits the selected drone observation platform 135A to receive sensor data and/or any other payload data from the drone 105A. Additionally, or alternatively, the observation communication session 415 may permit the drone observation platform 135A to transmit control data to the drone to control operation of, for example, sensor(s) and/or other equipment (e.g., tools, object manipulators, etc.) carried by the drone 105A (e.g., included in the payload unit 115A of the drone 105A).

In some examples, the interaction plane processor 320 of the example drone operations manager 125 of FIG. 3 includes an example drone data filter 345 to block (e.g., permanently, selectively, etc.) flight control data from being exchanged between the selected drone observation platform 135A and the selected drone 105A via the example observation communication session 415 to prevent the drone observation platform 135A from being used to remotely pilot the drone 105A. For example, the drone data filter 345 can block data packets having a source or destination address associated with a communication transceiver of the flight control unit 110A of the selected drone 105A. Additionally, or alternatively, the drone data filter 345 can perform data packet inspection to block data packets formatted to transmit flight control commands to the selected drone 105A, formatted to transmit flight control feedback data from the drone 105A, etc.

In some such examples, the drone data filter 345 blocks flight control data from being exchanged between the selected drone observation platform 135A and the selected drone 105A via the example observation communication session 415 permanently, thereby preventing the drone observation platform 135A from ever being used to remotely pilot the drone 105A. However, in other examples, the drone data filter 345 implements selective blocking of the flight control data, which permits the drone observation platform 135A to be used as a secondary piloting platform for flying the selected drone 105A, with the selected flight control platform 130 being the primary piloting platform for flying the drone. For example, the drone data filter 345 may selectively block or unblock flight control data from being exchanged between the selected drone observation platform 135A and the selected drone 105A via the example observation communication session 415 based on an override command received from the flight control platform 130. Such an implementation permits the SME to remotely pilot the selected drone 105A at the target location 150 via the drone observation platform 135A, but allows the drone pilot to retain overall responsibility for piloting the drone via the flight control platform 130 (e.g., by selectively overriding the ability of the drone observation platform 135A to remotely pilot the drone 105A for safety reasons, regulatory compliance, etc.).

In some examples, the session initiator 340 of the example interaction plane processor 320 utilizes the same conferencing communication session 410, or other conferencing sessions, to allow personnel at the target location 150 to interact with the SME and/or the drone pilot. For example, the session initiator 340 may monitor the conferencing communication session 410 and add/delete the communication devices 160A-B of the on-site personnel (and/or communication device(s) associated with other personnel) to/from the conferencing communication session 410 as appropriate. In this way, the communication devices 160A-B can be used to exchange multimedia data (e.g., voice data, video data, text data) with the selected flight control platform 130 and/or the selected drone observation platform 135A to permit other remote and/or on-scene personnel to interact with the SME and/or drone pilot, and/or to permit information obtained (e.g., sensed) by the drone 105A to be conveyed to other remote and/or on-scene personnel, etc., as appropriate. Additionally, or alternatively, in some examples, the session initiator 340 of the example interaction plane processor 320 initiates one or more observation communication sessions between the communication devices 160A-B and the drone 105A (e.g., separate from the observation communication session 415) to allow the communication devices 160A-B to interact with the payload unit 115A of the drone 105A, as described above. Such capabilities can improve the operational response and safety at the target location 150, resulting in a safe or cost effective response, including potentially avoiding the need to dispatch responding personnel to the target location 150.

Because the drones 105A-C typically have limited operational power, the management plane processor 310 of the example drone operations manager 125 of FIG. 3 includes an example drone monitor 350 to monitor drone operation. For example, the drone monitor 350 may receive reports and/or warning messages from deployed drones, such as the deployed drone 105A, which indicate that the drone is running low on power. In some examples, in response to a low power report/warning message received from the drone 105A, and/or in response to a command received from the drone pilot via the flight control platform 130, the drone monitor 350 cause the management plane processor 310 to deploy additional drone(s), such as the example drone 105B, to achieve continuity of drone service at the target location 150. For example, the management plane processor 310 can repeat the operations described above to select an appropriate backup drone(s), such as the drone 105B, to relieve the primary drone 105A on station, and can determine a flight plan for the selected drone.

To support handoff of the drone service from the primary drone 105A to the backup drone 105B, the piloting plane processor 315 of the example drone operations manager 125 of FIG. 3 includes an example session handoff manager 355. For example, a second pilot may fly the backup drone 105B via a second flight control platform to the target location 150. The example session handoff manager 355 may then use any appropriate communications handoff procedure to swap control of the drones 105A and 105B such that the first pilot can continue to pilot the backup drone 105B at the target location 150, while the second pilot returns the former primary drone 105A to its staging area.

In some examples, the management plane processor 310 of the example drone operations manager 125 of FIG. 3 supports anticipatory drone dispatching. For example, the drone monitor 350 may monitor the positions of deployed drones (e.g., in addition to monitoring the power status of deployed drones). If the drone monitor 350 determines that a deployed drone, such as the drone 105A, being controlled by the pilot is anticipated to move beyond its operational range and/or deviate from its filed flight plan, the management plane processor 310 can deploy another drone using the procedures described above to replace the first drone 105A at an appropriate point along the drone's flight path. The example session handoff manager 355 can be used to swap control of the drones at the appropriate time. Anticipatory drone dispatching can be beneficial in many scenarios, such as scenarios in which the target location 150 is moving (e.g., such as when the drone 105A is used to monitor a high-speed car chase, a wildfire, etc.).

Figure 5:
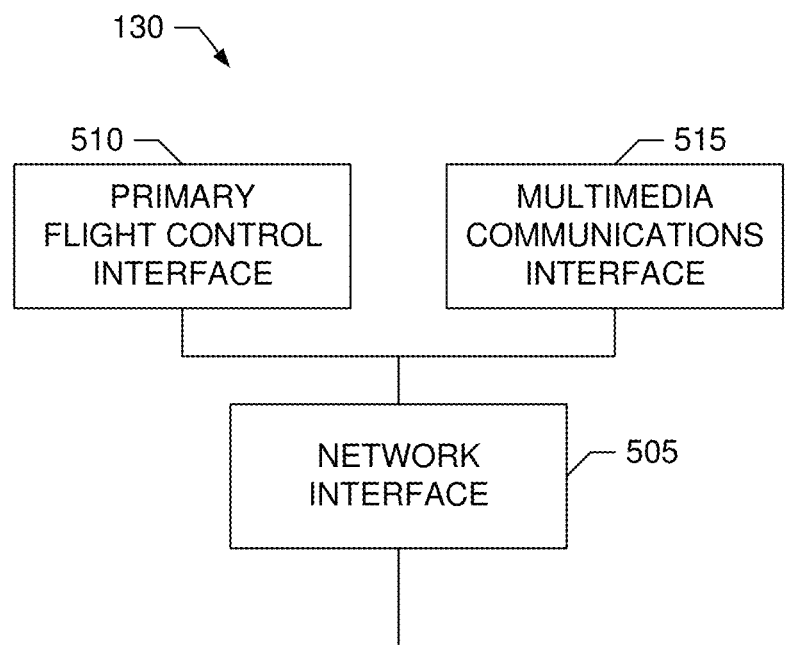
FIG. 5 is a block diagram of an example flight control platform that may be used to implement the example drone operations system of FIG. 1.

An example implementation of the flight control platform 130 of FIG. 1 is illustrated in FIG. 5. The example flight control platform 130 of FIG. 5 includes an example network interface 505 to communicate with one or more communication networks, links, etc., such as the example network 140 of FIG. 1. The example network interface 505 can be implemented by any type(s), number(s) and/or combination(s) of interfaces, such as the example interface circuit 1220 of FIG. 12, which is described in further detail below.

The example flight control platform 130 of FIG. 5 also include an example primary flight control interface 510 to implement a user interface via which a user may pilot a drone, such as one or more of the example drones 105A-C. For example, the primary flight control interface 510 implements and/or interfaces with one or more physical controls (e.g., a joystick, a trackball, a keyboard, etc.) and/or virtual interface controls (e.g., one or more virtual touchscreen interface buttons, pads, sliders, switches) capable of generating flight control commands to be sent, via the network interface 505, to the flight control unit (e.g., the example flight control unit 110A) of the drone (e.g., the drone 105A) being piloted. The primary flight control interface 510 also displays or otherwise presents flight control feedback data and/or other sensor data (e.g., such as instrumentation data, video data, etc.) received from the drone (e.g., from the drone flight control unit and/or the drone payload unit) via the network interface 505. In the illustrated example of FIG. 5, the primary flight control interface 510 further implements a communication endpoint of a piloting communication session, such as the piloting communication session 405, to exchange the flight control commands and flight control feedback/sensor data with the drone being piloted (e.g., the drone 105A), as described above and in further detail below. In some examples, the primary flight control interface 510 also interfaces with the payload unit (e.g., the payload unit 115A) of the drone (e.g., the drone 105A) to permit control of the sensors and/or other equipment carried by the drone, as described above and in further detail below.

The example flight control platform 130 of FIG. 5 further includes an example multimedia communications interface 515 to implement a communications endpoint for conferencing communication sessions (e.g., such as the example conferencing communication session 410) established with other communication endpoints (e.g., such as the example drone observation platforms 135A-C and/or the example communication devices 160A-B). For example, the multimedia communications interface 515 may include a teleconferencing application to be executed to exchange multimedia data (e.g., voice data, video data, text data, graphical data, etc.) via the network interface 505 with other communication endpoints included in a conferencing communication session (e.g., such as the example conferencing communication session 410). Additionally, or alternatively, the multimedia communications interface 515 may include data processing and/or other applications to be executed to generate processed data (e.g., graphical data, tabular data, etc.) from sensor data received from a deployed drone. The multimedia communications interface 515 may then share this processed data with the other communication endpoints (e.g., such as the example drone observation platforms 135A-C and/or the example communication devices 160A-B) included in the conferencing communication session (e.g., such as the example conferencing communication session 410), as described above and in further detail below.

Figure 6:
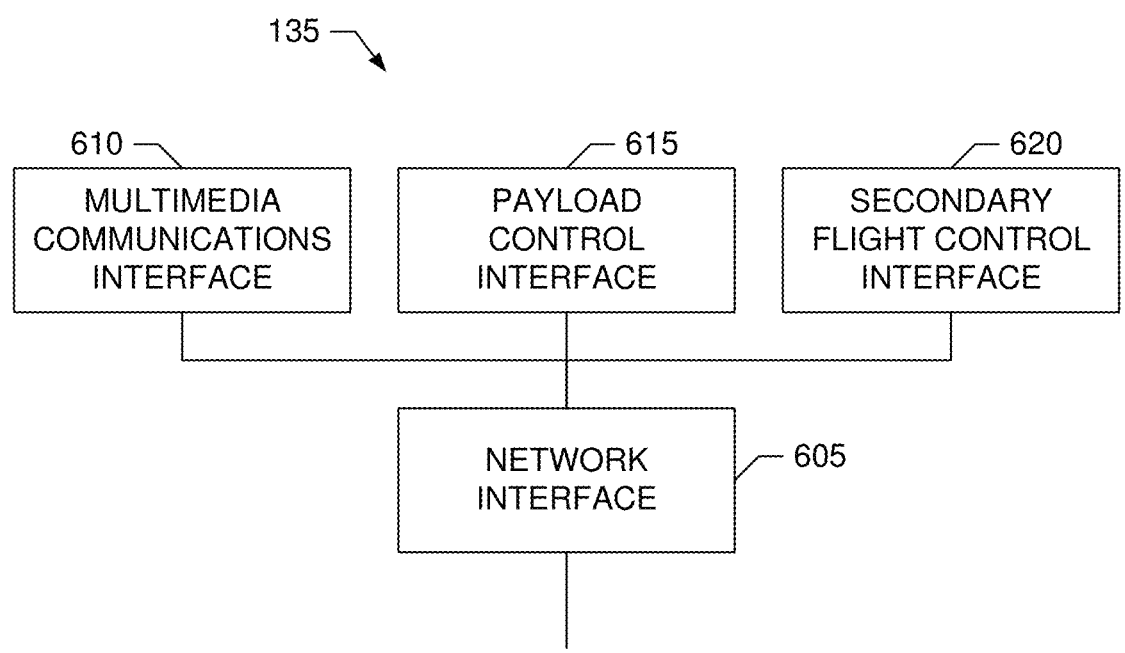
FIG. 6 is a block diagram of an example drone observation platform that may be used to implement the example drone operations system of FIG. 1.

An example drone observation platform 135 that may be used to implement one or more of the example drone observation platforms 135A-C of FIG. 1 is illustrated in FIG. 6. The example drone observation platform 135 of FIG. 6 includes an example network interface 605 to communicate with one or more communication networks, links, etc., such as the example network 140 of FIG. 1. The example network interface 605 can be implemented by any type(s), number(s) and/or combination(s) of interfaces, such as the example interface circuit 1320 of FIG. 13, which is described in further detail below.

The example drone observation platform 135 of FIG. 6 also includes an example multimedia communications interface 610 to implement a communications endpoint for conferencing communication sessions (e.g., such as the example conferencing communication session 410) established with other communication endpoints (e.g., such as the example flight control platforms 130 and/or the example communication devices 160A-B). For example, the multimedia communications interface 610 may include a teleconferencing application to be executed to exchange multimedia data (e.g., voice data, video data, text data, graphical data, etc.) via the network interface 605 with other communication endpoints included in a conferencing communication session (e.g., such as the example conferencing communication session 410). Additionally, or alternatively, the multimedia communications interface 610 may include data processing and/or other applications to be executed to generate processed data (e.g., graphical data, tabular data, etc.) from sensor data received from a deployed drone. The multimedia communications interface 610 may then share this processed data with the other communication endpoints (e.g., such as the example flight control platforms 130 and/or the example communication devices 160A-B) included in the conferencing communication session (e.g., such as the example conferencing communication session 410), as described above and in further detail below.

The example drone observation platform 135 of FIG. 6 further includes an example payload control interface 615 to implement a communications endpoint for observation communication sessions (e.g., such as the example observation communication session 415) established with one or more deployed drones (e.g., such as the example drone 105A). The payload control interface 615 implements and/or interfaces with one or more physical controls (e.g., a joystick, a trackball, a keyboard, etc.) and/or virtual interface controls (e.g., one or more virtual touchscreen interface buttons, pads, sliders, switches) capable of generating payload control commands to be sent, via the network interface 605, to control sensors, equipment, etc., included in the payload unit (e.g., the example payload unit 115A) of a deployed drone (e.g., the drone 105A). The payload control interface 615 also displays or otherwise presents sensor data (e.g., such as instrumentation data, video data, etc.) received from the drone (e.g. the drone payload unit) via the network interface 605.

The example drone observation platform 135 of FIG. 6 also includes an example secondary flight control interface 620 to exchange flight control commands and flight control feedback/sensor data with the drone being piloted (e.g., the drone 105A), as described above and in further detail below. In some examples, the ability to control a deployed drone (e.g., the drone 105A) via the secondary flight control interface 620 may be overridden by one or more commands issued by a flight control platform (e.g., such as the example flight control platform 130) also operating the deployed drone (e.g., the drone 105A).

Although the example drone deployment system 100 of FIG. 1 is depicted as including three example drones 105A-C, one example drone operations manager 125, one example flight control platform 130 and three example drone observation platforms 135A-C, the example drone deployment system 100 is not limited thereto. For example, the drone deployment system 100 can include any number of drones 105A-C, drone operations managers 125, flight control platforms 130 and/or drone observation platforms 135A-C implemented to support computer aided dispatch of drones in accordance with the teachings of this disclosure. Also, although the example drone deployment system 100 of FIG. 1 is depicted as receiving service requests from one example CAD system 145, the example drone deployment system 100 is not limited thereto. For example, the drone deployment system 100 can include one or more drone operations managers 125 structured to receive service requests from any number of CAD systems 145, and/or from any other source(s) of service requests. For example, service requests can originate from any computing device capable of specifying a target location (e.g., using global positioning system (GPS) coordinates, latitude and longitude coordinates, preconfigured waypoints, etc.) to which a drone is to be deployed.

Furthermore, computer aided dispatch of drones as implemented by the example drone deployment system 100 disclosed herein can be applied to many disciplines including, but not limited to, emergency response scenarios. For example, consider the issues faced by public utility companies, such as telecommunications and electric utility companies. After a storm, the example drone deployment system 100 can be used to dispatch one or more drones 105A-C to one or more facilities associated with one or more utility outage areas (e.g., including an outage area associated with the target location 150). An SME can use information obtained via a deployed drone to evaluate whether there is a problem with a particular facility (e.g., power station, cell tower, etc.) and which resources, (e.g., a bucket truck, or just a service van) should be dispatched. Remote inspection of the facility using a drone can save the utility company a substantial amount of money, but should be done quickly to achieve desired outage response times. The example drone deployment system 100 enables such quick response times.

While example manners of implementing the example drone deployment system 100 are illustrated in FIGS. 1-6, one or more of the elements, processes and/or devices illustrated in FIGS. 1-6 may be combined, divided, re-arranged, omitted, eliminated and/or implemented in any other way. Further, the example drones 105A, the example flight control unit 110A, the example payload unit 115A, the example docking stations 120B-C, the example drone operations manager 125, the example flight control platform 130, the example drone observation platforms 135 and/or 135A-C, the example networks 140 and/or 155, the example communication devices 160A-B, the example drone management plane 205, the example piloting plane 210, the example drone interaction plane 215, example network interface 305, the example management plane processor 310, the example piloting plane processor 315, the example interaction plane processor 320, the example CAD request processor 325, the example flight plan processor 330, the example session initiator 335, the example session initiator 340, the example drone data filter 345, the example drone monitor 350, the example session handoff manager 355, the example network interface 505, the example primary flight control interface 510, the example multimedia communications interface 515, the example network interface 605, the example multimedia communications interface 610, the example payload control interface 615, the example secondary flight control interface 620 and/or, more generally, the example drone deployment system 100 of FIGS. 1-6 may be implemented by hardware, software, firmware and/or any combination of hardware, software and/or firmware. Thus, for example, any of the example drones 105A, the example flight control unit 110A, the example payload unit 115A, the example docking stations 120B-C, the example drone operations manager 125, the example flight control platform 130, the example drone observation platforms 135 and/or 135A-C, the example networks 140 and/or 155, the example communication devices 160A-B, the example drone management plane 205, the example piloting plane 210, the example drone interaction plane 215, example network interface 305, the example management plane processor 310, the example piloting plane processor 315, the example interaction plane processor 320, the example CAD request processor 325, the example flight plan processor 330, the example session initiator 335, the example session initiator 340, the example drone data filter 345, the example drone monitor 350, the example session handoff manager 355, the example network interface 505, the example primary flight control interface 510, the example multimedia communications interface 515, the example network interface 605, the example multimedia communications interface 610, the example payload control interface 615, the example secondary flight control interface 620 and/or, more generally, the example drone deployment system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example drone deployment system 100, the example drones 105A, the example flight control unit 110A, the example payload unit 115A, the example docking stations 120B-C, the example drone operations manager 125, the example flight control platform 130, the example drone observation platforms 135 and/or 135A-C, the example networks 140 and/or 155, the example communication devices 160A-B, the example drone management plane 205, the example piloting plane 210, the example drone interaction plane 215, example network interface 305, the example management plane processor 310, the example piloting plane processor 315, the example interaction plane processor 320, the example CAD request processor 325, the example flight plan processor 330, the example session initiator 335, the example session initiator 340, the example drone data filter 345, the example drone monitor 350, the example session handoff manager 355, the example network interface 505, the example primary flight control interface 510, the example multimedia communications interface 515, the example network interface 605, the example multimedia communications interface 610, the example payload control interface 615 and/or the example secondary flight control interface 620 is/are hereby expressly defined to include a tangible computer readable storage device or storage disk such as a memory, a digital versatile disk (DVD), a compact disk (CD), a Blu-ray disk, etc. storing the software and/or firmware. Further still, the example drone deployment system 100 may include one or more elements, processes and/or devices in addition to, or instead of, those illustrated in FIGS. 1-6, and/or may include more than one of any or all of the illustrated elements, processes and devices.

Flowcharts representative of example machine readable instructions for implementing the example drone deployment system 100, the example drones 105A, the example flight control unit 110A, the example payload unit 115A, the example docking stations 120B-C, the example drone operations manager 125, the example flight control platform 130, the example drone observation platforms 135 and/or 135A-C, the example networks 140 and/or 155, the example communication devices 160A-B, the example drone management plane 205, the example piloting plane 210, the example drone interaction plane 215, example network interface 305, the example management plane processor 310, the example piloting plane processor 315, the example interaction plane processor 320, the example CAD request processor 325, the example flight plan processor 330, the example session initiator 335, the example session initiator 340, the example drone data filter 345, the example drone monitor 350, the example session handoff manager 355, the example network interface 505, the example primary flight control interface 510, the example multimedia communications interface 515, the example network interface 605, the example multimedia communications interface 610, the example payload control interface 615 and/or the example secondary flight control interface 620 are shown in FIGS. 7A-B and 8-10. In these examples, the machine readable instructions comprise one or more programs for execution by a processor, such as the processors 1112, 1212 and/or 1312 shown in the example processor platforms 1100, 1200 and/or 1300 discussed below in connection with FIGS. 11-13. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 1112, 1212 and/or 1312, but the entire program or programs and/or portions thereof could alternatively be executed by a device other than the processors 1112, 1212 and/or 1312, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7A-B and 8-10, many other methods of implementing the example drone deployment system 100, the example drones 105A, the example flight control unit 110A, the example payload unit 115A, the example docking stations 120B-C, the example drone operations manager 125, the example flight control platform 130, the example drone observation platforms 135 and/or 135A-C, the example networks 140 and/or 155, the example communication devices 160A-B, the example drone management plane 205, the example piloting plane 210, the example drone interaction plane 215, example network interface 305, the example management plane processor 310, the example piloting plane processor 315, the example interaction plane processor 320, the example CAD request processor 325, the example flight plan processor 330, the example session initiator 335, the example session initiator 340, the example drone data filter 345, the example drone monitor 350, the example session handoff manager 355, the example network interface 505, the example primary flight control interface 510, the example multimedia communications interface 515, the example network interface 605, the example multimedia communications interface 610, the example payload control interface 615 and/or the example secondary flight control interface 620 may alternatively be used. For example, with reference to the flowcharts illustrated in FIGS. 7A-B and 8-10, the order of execution of the blocks may be changed, and/or some of the blocks described may be changed, eliminated, combined and/or subdivided into multiple blocks.

As mentioned above, the example processes of FIGS. 7A-B and 8-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7A-B and 8-10 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 7A:
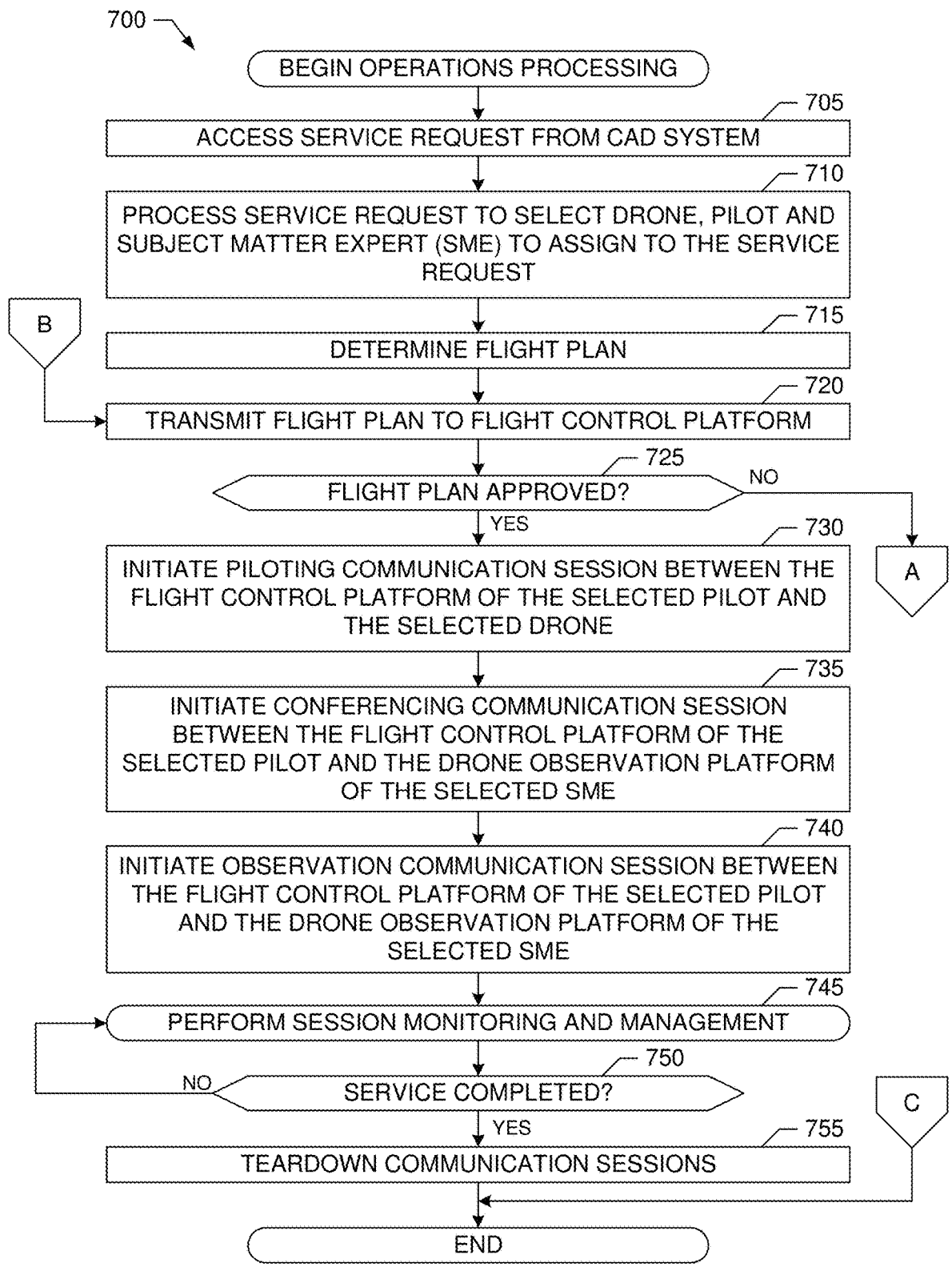
FIGS. 7A-B and 8 are flowcharts representative of example machine readable instructions that may be executed to implement the example drone operations manager of FIG. 3.
Figure 7B:
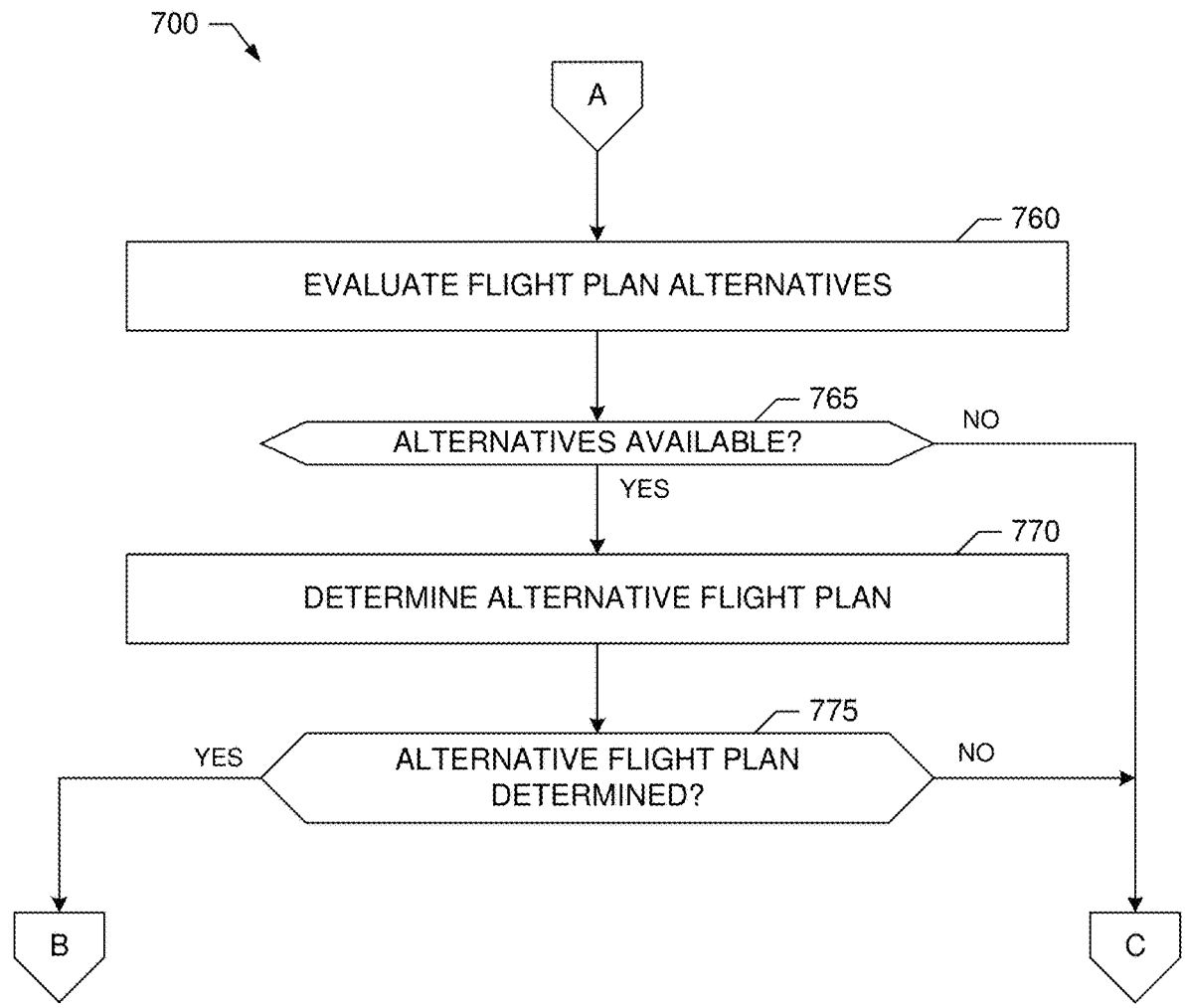

An example program 700 that may be executed to implement the example drone operations manager 125 of FIGS. 1, 3 and/or 4 is represented by the flowchart illustrated in FIGS. 7A-B. For convenience and without loss of generality, execution of the example program 700 is described from the perspective of the example drone operations manager 125 of FIG. 3 being included in the example drone deployment system 100 of FIGS. 1 and 4. With reference to the preceding figures and associated written descriptions, the example program 700 begins execution at block 705 of FIG. 7A at which the example CAD request processor 325 of the example management plane processor 310 included in the drone operations manager 125 accesses a service request received from the example CAD system 145. At block 710, the CAD request processor 325 processes a target location and/or other descriptive information included in the service request to select a drone, to select a flight control platform associated with a pilot and to select a drone observation platform associated with a SME to support the service request. The remainder of the description of FIGS. 7A-B assumes that, at block 710, the CAD request processor 325 selects the drone 105A, the flight control platform 130 and the drone observation platform 135 to support the service request, and the service request is for the target location 150.

At block 715, the example flight plan processor 330 of the example management plane processor 310 included in the drone operations manager 125 determines a flight plan for flying the selected drone 105A to the target location 150. At block 720, the flight plan processor 330 transmits the determined flight plan to the selected flight control platform 130 to request approval of the flight plan. If the flight plan processor 330 receives a reply message from the flight control platform 130 indicating that the flight plan has been approved (block 725), processing proceeds to block 730. Otherwise, execution of the program 700 proceeds to block 760 of FIG. 7B.

At block 760 of FIG. 7B, the flight plan processor 330 evaluates flight plan alternatives in an attempt to obtain approval of an alternate flight plan by varying one or more parameters/preferences used to determine the flight plan. For example, at block 760, the flight plan processor 330 may determine whether one or more parameters/preferences used by the automating mapping application(s) to determine the flight plan can be varied. Additionally, or alternatively, at block 760, the flight plan processor 330 may evaluate whether one or more other drones 105B-C, possibly located at other staging location(s), are available and may yield an alternative flight plan. If the flight plan processor 330 determines that such alternative parameters/preferences for generating a flight plan are available (block 765), processing proceeds to block 770 at which the flight plan processor 330 determines an alternative flight plan for flying the selected drone (e.g., which may be the same as, or different from, the drone 105A selected at block 710) to the target location 150. If determination of an alternative flight plan is successful (block 770), processing returns to block 720 of FIG. 7A at which the flight plan processor 330 transmits the alternative flight plan to the selected flight control platform 130 to request approval of the alternative flight plan. However, if determination of an alternative flight plan is unsuccessful (block 770), execution of the example program 700 ends. In some examples, the flight plan processor 330 continues to iterate through the processing of blocks 760-775 until either an alternative flight plan is approved or the possible alternative flight plans have been exhausted.

In some examples, obtaining approval of the flight plan at block 725 also involves the flight plan processor 330 transmitting the flight plan (e.g., after receiving approval from the drone pilot via the flight control platform 130) to the appropriate regulating agency (e.g., the FAA) and receiving approval of the flight plan from that agency. In some such examples, if the flight plan processor 330 receives a response message from the appropriate agency indicating the flight plan is approved, processing proceeds from block 725 to block 730. Otherwise, processing proceeds to block 760 at which the flight plan processor 330 attempts to determine an alternative flight plan. In some such examples, the regulating agency (e.g., the FAA) may indicate that the flight plan is transiently not approvable (e.g., because the flight plan crosses the path of another aerial device), but may be approvable at a later time. Additionally, or alternatively, the regulating agency (e.g., the FAA) may return one or more processing codes to indicate to the flight plan processor 330 how to resolve one or more problems with the submitted flight plan (e.g., such as a code indicating the selected pilot of the selected drone 105A has an expired license, etc.). In some such examples, at blocks 760 and/or 770, the flight plan processor 330 implements logic to process such code(s) and/or transient disapproval indication(s) to resolve the identified problem(s) with the submitted flight plan.

In some examples, at blocks 715 and/or 770, the flight plan processor 330 determines flight plans to avoid restricted airspace (e.g., around airports, secure facilities, etc.) by default. In some such examples, the appropriate regulating agency (e.g., the FAA) can provide a key, a code, etc., or other authorization mechanism to the flight plan processor 330 to permit the flight plan processor 330 to override (e.g., ignore) these default restrictions (e.g., based on need). In some examples, the appropriate regulating agency (e.g., the FAA) can also provide a key, a code, etc., or other authorization mechanism to the flight plan processor 330 to configure the selected drone (e.g., the drone 105A) to broadcast a restriction override or other authorization signal to, for example, disable any active deterrents that may attempt to interfere with the drone while it operates in the restricted airspace.

Figure 8:
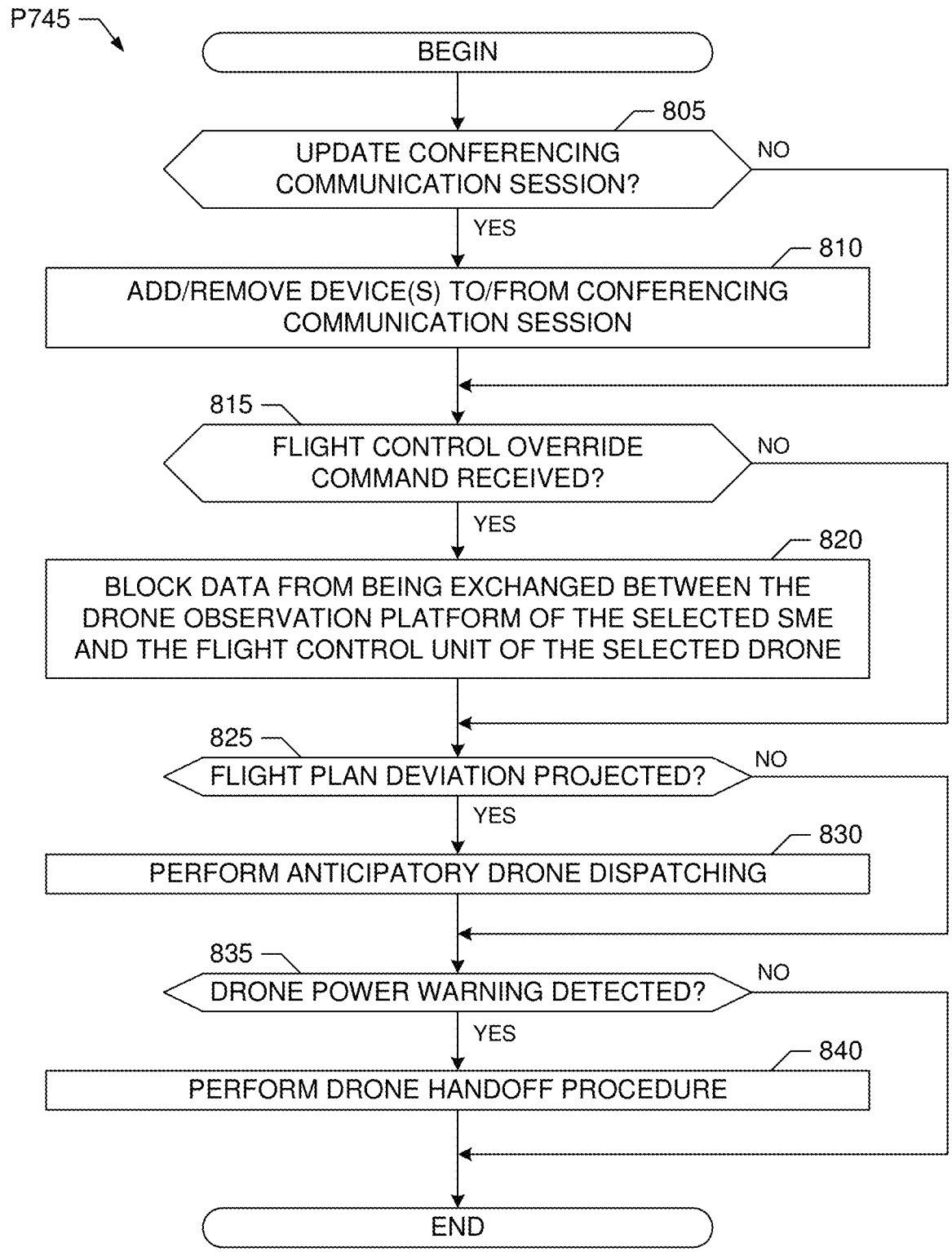

At block 745, the drone operations manager 125 performs session monitoring and management while the selected drone 105A is deployed. Example machine readable instructions that may be executed to perform the processing at block 745 are illustrated in FIG. 8, which is described in further detail below. At block 750, the drone operations manager 125 determines whether the support of the service request has completed. For example, the drone operations manager 125 may determine that support of the service request has completed when the selected drone 105A has returned to its staging area and no backup/secondary drone is operating as its replacement. If support of the service request has not completed (block 750), processing returns to block 745. However, if support of the service request has completed (block 750), then the drone operations manager 125 tears down (or, in other words, terminates) (block 755) the communication session initiated to support the service request. Execution of the example program 700 then ends.

At block 745, the drone operations manager 125 performs session monitoring and management while the selected drone 105A is deployed. Example machine readable instructions that may be executed to perform the processing at block 745 are illustrated in FIG. 8, which is described in further detail below. At block 750, the drone operations manager 125 determines whether the support of the service request has completed. For example, the drone operations manager 125 may determine that support of the service request has completed when the selected drone 105A has returned to its staging area and no backup/secondary drone is operating as its replacement. If support of the service request has not completed (block 750), processing returns to block 745. However, if support of the service request has completed (block 750), then the drone operations manager 125 tears down (or, in other words, terminates) the communication session initiated to support the service request. Execution of the example program 700 then ends.

An example program P745 that may be executed to perform the processing at block 745 of FIG. 7A is represented by the flowchart illustrated in FIG. 8. For convenience and without loss of generality, execution of the example program P745 is described from the perspective of the example drone operations manager 125 of FIG. 3 being included in the example drone deployment system 100 of FIGS. 1 and 4. With reference to the preceding figures and associated written descriptions, the example program P745 begins execution at block 805 at which the example session initiator 340 of the example interaction plane processor 320 included in the drone operations manager 125 determines whether the example conferencing communication session 410, which was originally initiated between the selected drone observation platform 135A and the selected flight control platform 130, is to be updated. If the conferencing communication session 410 is to be updated (block 805), then at block 810 the session initiator 340 of the example interaction plane processor 320 adds and/or removes communication device(s), such as the communication device(s) 160A-B, to/from the conferencing communication session 410, as appropriate.

At block 815, the example drone data filter 345 of the example interaction plane processor 320 included in the drone operations manager 125 determine whether a flight control override command has been received from the selected flight control platform 130. If a flight control override command has been received (block 815), then at block 820 the drone data filter 345 blocks flight control data (and possibly flight control feedback/sensor data) from being exchanged between the selected drone observation platform 135A and the selected drone 105A via the example observation communication session 415 to prevent the drone observation platform 135A from being used to remotely pilot the drone 105A.

At block 825, the example drone monitor 350 of the example management plane processor 310 included in the drone operations manager 125 determines whether the deployed drone 105A is projected to deviate from its flight plan. If flight plan deviation is projected (block 825), then at block 830 the management plane processor 310 included in the drone operations manager 125 performs anticipatory drone dispatching, as described above.

At block 835, the example drone monitor 350 of the example management plane processor 310 determines whether the selected drone 105A has reported a low power warning. If the selected drone 105A has reported a low power warning (block 835), then at block 840 the example session handoff manager 355 of the example piloting plane processor 315 included in the drone operations manager 125 performs a drone handoff procedure, as described above, to handoff drone operations at the target location 150 to a backup drone, such as the drone 105B.

Figure 4:
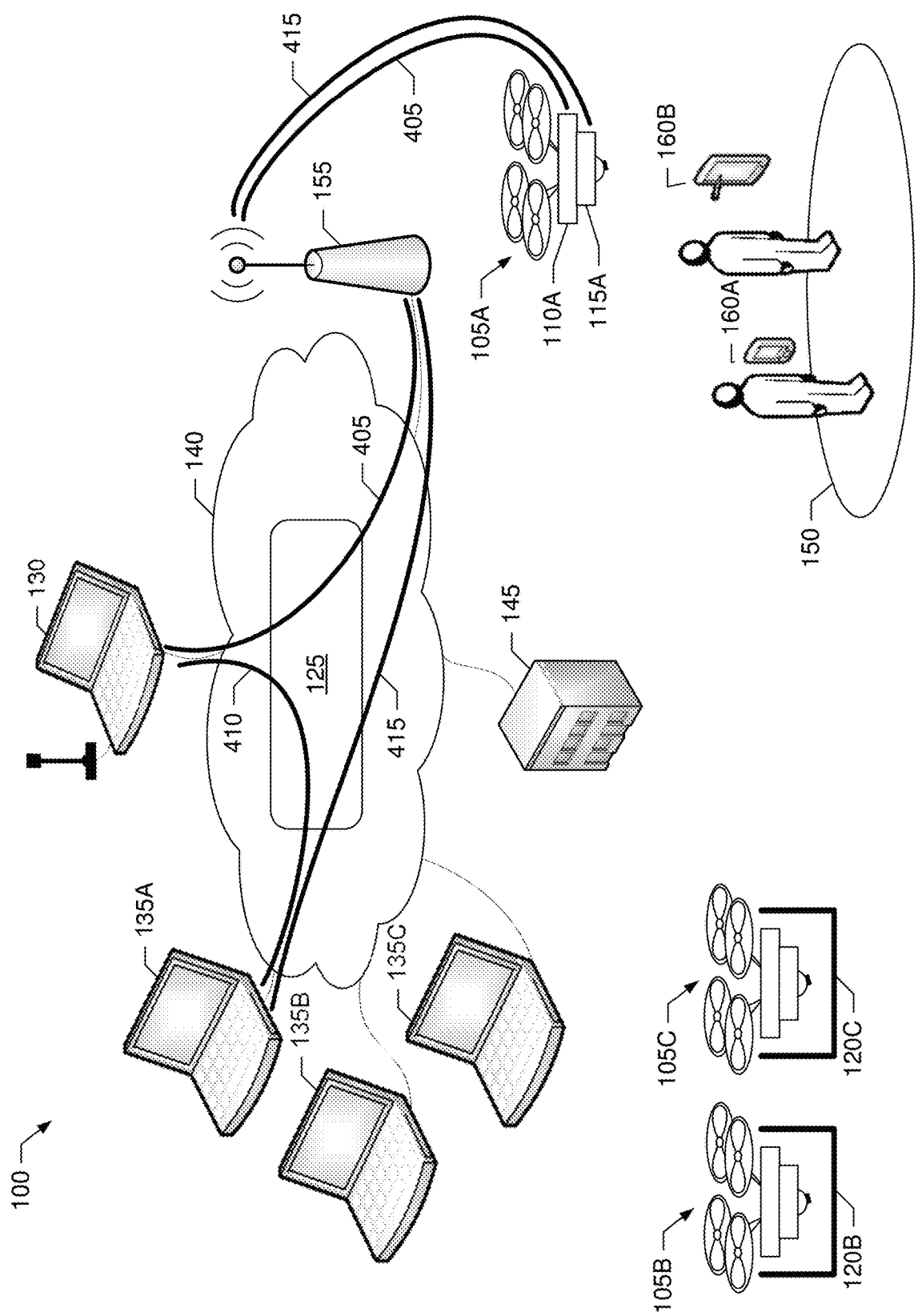
FIG. 4 illustrates example communications sessions initiated by the example drone operations manager of FIG. 3 to dispatch drones in the example drone operations system of FIG. 1 in accordance with the teachings of this disclosure
Figure 9:
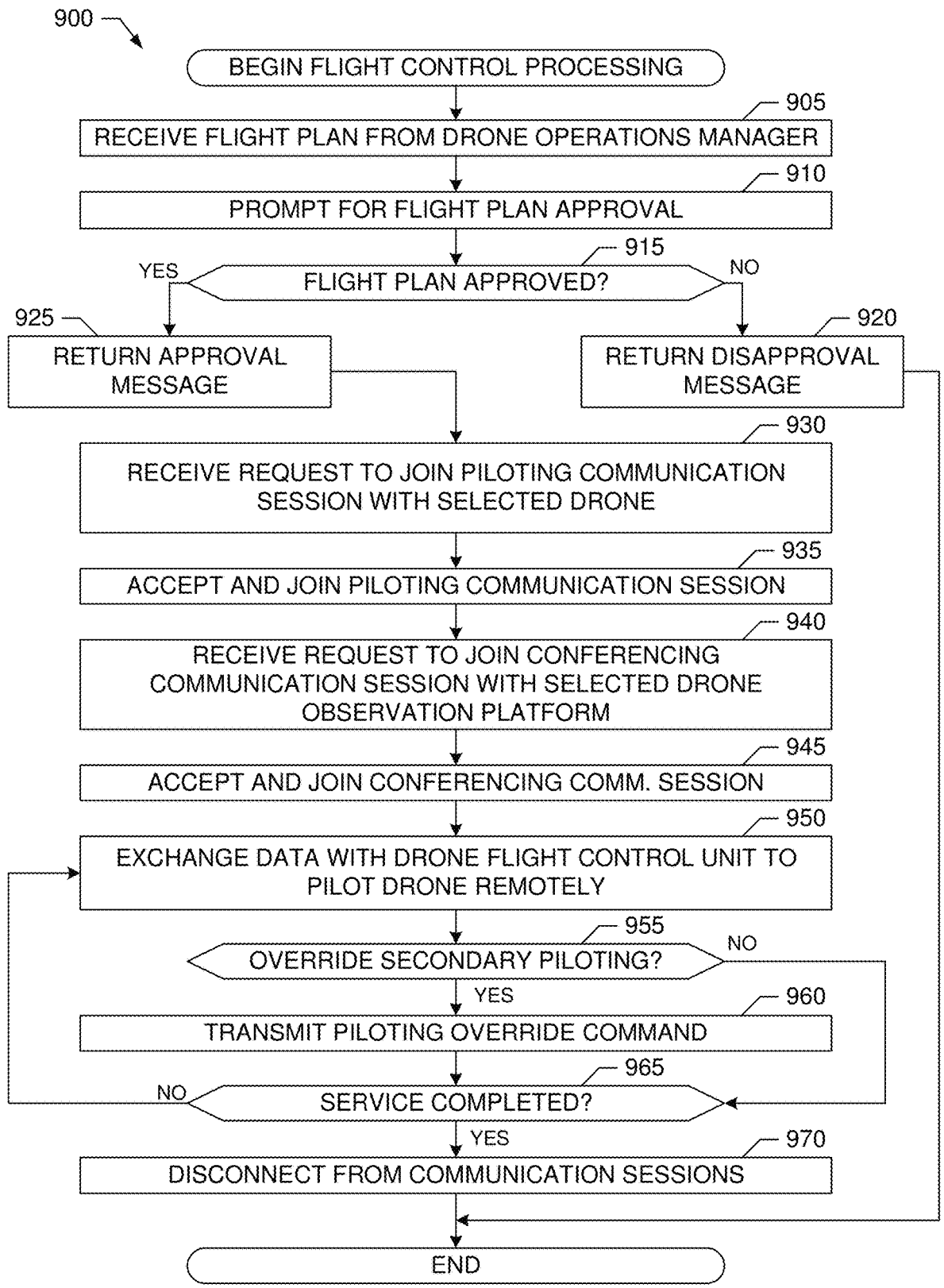
FIG. 9 is a flowchart representative of example machine readable instructions that may be executed to implement the example flight control platform of FIG. 5.

An example program 900 that may be executed to implement the example flight control platform 130 of FIGS. 1, 4 and/or 5 is represented by the flowchart illustrated in FIG. 9. For convenience and without loss of generality, execution of the example program 900 is described from the perspective of the example flight control platform 130 of FIG. 5 being included in the example drone deployment system 100 of FIGS. 1 and 4. With reference to the preceding figures and associated written descriptions, the example program 900 of FIG. 9 begins execution at block 905 at which the example primary flight control interface 510 of the flight control platform 130 receives a flight plan from the example drone operations manager 125. At block 910, the flight control interface 510 generates one or more user interface prompts for a pilot operating the flight control platform 130 to approve or disapprove the received flight plan. If a user input received in response to the user interface prompt(s) indicates that the flight plan has not been approved (block 915), then at block 920 the flight control interface 510 returns a reply message to the drone operations manager 125 indicating that the flight plan has not been approved. Execution of the example program 900 then ends.

However, if a user input received in response to the user interface prompt(s) indicates that the flight plan has been approved (block 915), then at block 925 the flight control interface 510 returns a reply message to the drone operations manager 125 indicating that the flight plan has been approved. Sometime later, at block 930, the flight control interface 510 receives a request to join the example piloting communication session 405 being initiated between the selected drone 105A and the flight control platform 130. At block 935, the flight control interface 510 accepts the request (e.g., automatically or responsive to a user input) and joins the piloting communication session 405 to enable flight control commands and flight control feedback/sensor data to be exchanged with the drone 105A to permit remote piloting of the drone, as described above.

At block 940, the example multimedia communications interface 515 of the flight control platform 130 receives a request to join the example conferencing communication session 410 being initiated between the selected drone observation platform 135A and the flight control platform 130. At block 945, the multimedia communications interface 515 accepts the request (e.g., automatically or responsive to a user input) and joins the conferencing communication session 410 to enable multimedia data to be exchanged between the selected drone observation platform 135A and the flight control platform 130 to permit real-time interaction between the SME and the drone pilot, as described above.

At block 965, the flight control platform 130 determines whether remote piloting of the deployed drone 105A has completed (e.g., such as when the drone 105A has been returned to its staging area). If drone piloting is not completed (block 965), then processing returns to block 950 to permit the flight control platform 130 to continue to be used to remotely pilot the drone 105A. However, if drone piloting has completed (block 965), execution of the example program 900 then ends after the flight control platform 130 disconnects from communication sessions (block 970).

At block 965, the flight control platform 130 determines whether remote piloting of the deployed drone 105A has completed (e.g., such as when the drone 105A has been returned to its staging area). If drone piloting is not completed (block 965), then processing returns to block 950 to permit the flight control platform 130 to continue to be used to remotely pilot the drone 105A. However, if drone piloting has completed (block 965), execution of the example program 900 then ends.

Figure 10:
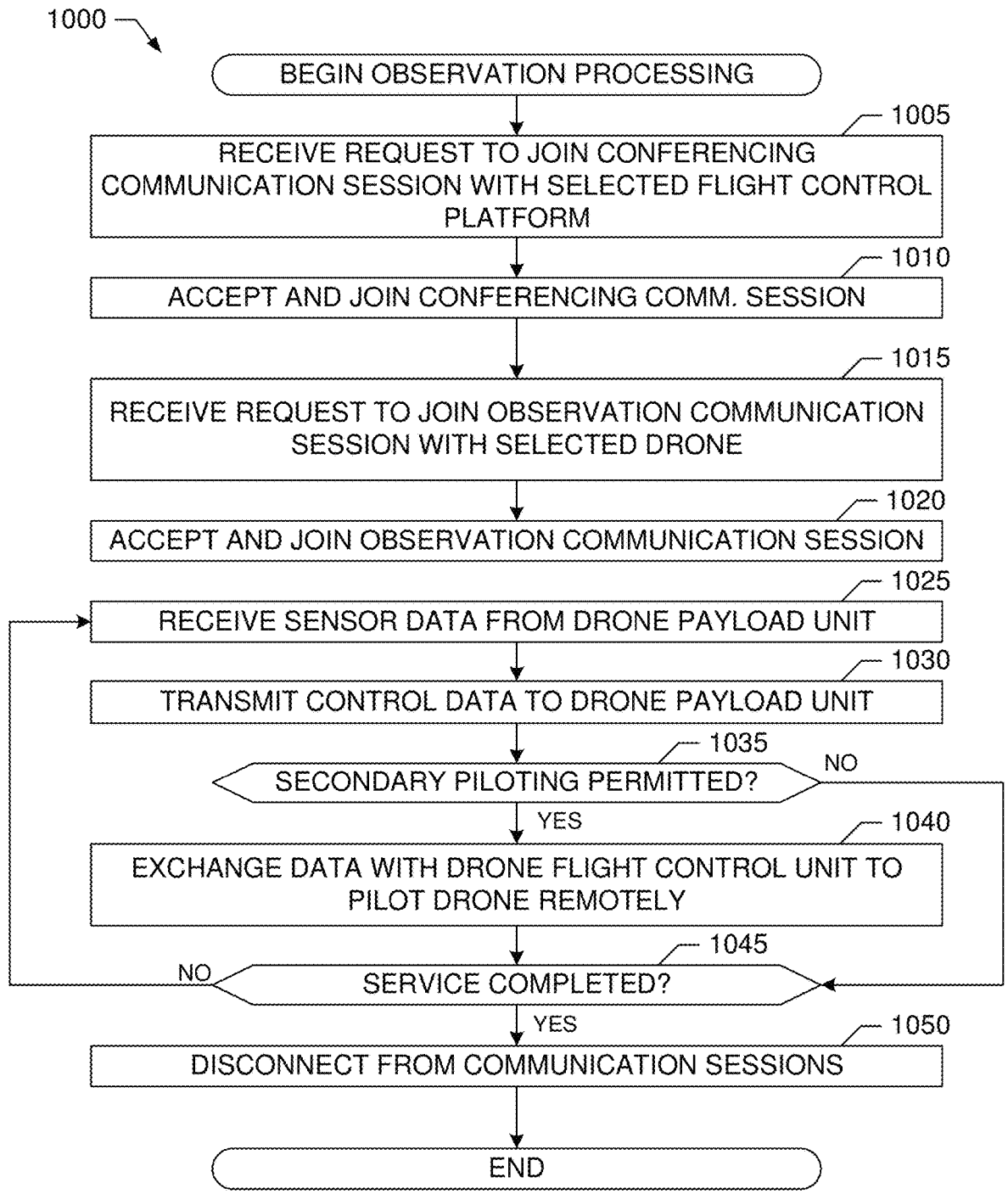
FIG. 10 is a flowchart representative of example machine readable instructions that may be executed to implement the example drone observation platform of FIG. 6.

An example program 1000 that may be executed to implement the example drone observation platforms 135 and/or 135A-C of FIGS. 1, 4 and/or 6 is represented by the flowchart illustrated in FIG. 10. For convenience and without loss of generality, execution of the example program 1000 is described from the perspective of the example drone observation platform 135 of FIG. 6 being used to implement the example drone observation platform 135A in the example drone deployment system 100 of FIGS. 1 and 4. With reference to the preceding figures and associated written descriptions, the example program 1000 of FIG. 10 begins execution at block 1005 at which the example multimedia communications interface 610 of the drone observation platform 135 receives a request to join the example conferencing communication session 410 being initiated between the selected flight control platform 130 and the drone observation platform 135. At block 1010, the multimedia communications interface 610 accepts the request (e.g., automatically or responsive to a user input) and joins the conferencing communication session 410 to enable multimedia data to be exchanged between the selected flight control platform 130 and the drone observation platform 135 to permit real-time interaction between the SME and the drone pilot, as described above.

At block 1015, the example payload control interface 615 of the drone observation platform 135 receives a request to join the example observation communication session 415 being initiated between the selected drone 105A and the drone observation platform 135. At block 1020, the payload control interface 615 accepts the request (e.g., automatically or responsive to a user input) and joins the observation communication session 415 to enable the drone observation platform 135 to interact with the sensor(s) and/or other equipment carried by the drone 105A (e.g., included in its payload unit 115A), as described above. For example, at block 1025, the payload control interface 615 receives sensor data via the observation communication session 415 from one or more sensors included in the payload unit 115A of the selected drone 105A. At block 1030, the payload control interface 615 transmits control data via the observation communication session 415 to control operation of one or more sensors and/or other equipment included in the payload unit 115A of the selected drone 105A.

At block 1045, the drone observation platform 135 determines whether deployment of the drone 105A has completed (e.g., such as when the drone 105A has been returned to its staging area). If drone deployment is not completed (block 1045), then processing returns to block 1025 to permit the drone observation platform 135 to exchanging data with the deployed drone 105A. However, if drone deployment has completed (block 1045), execution of the example program 1000 then ends after the drone observation platform 135 disconnects from communication sessions (block 1050).

Figure 11:
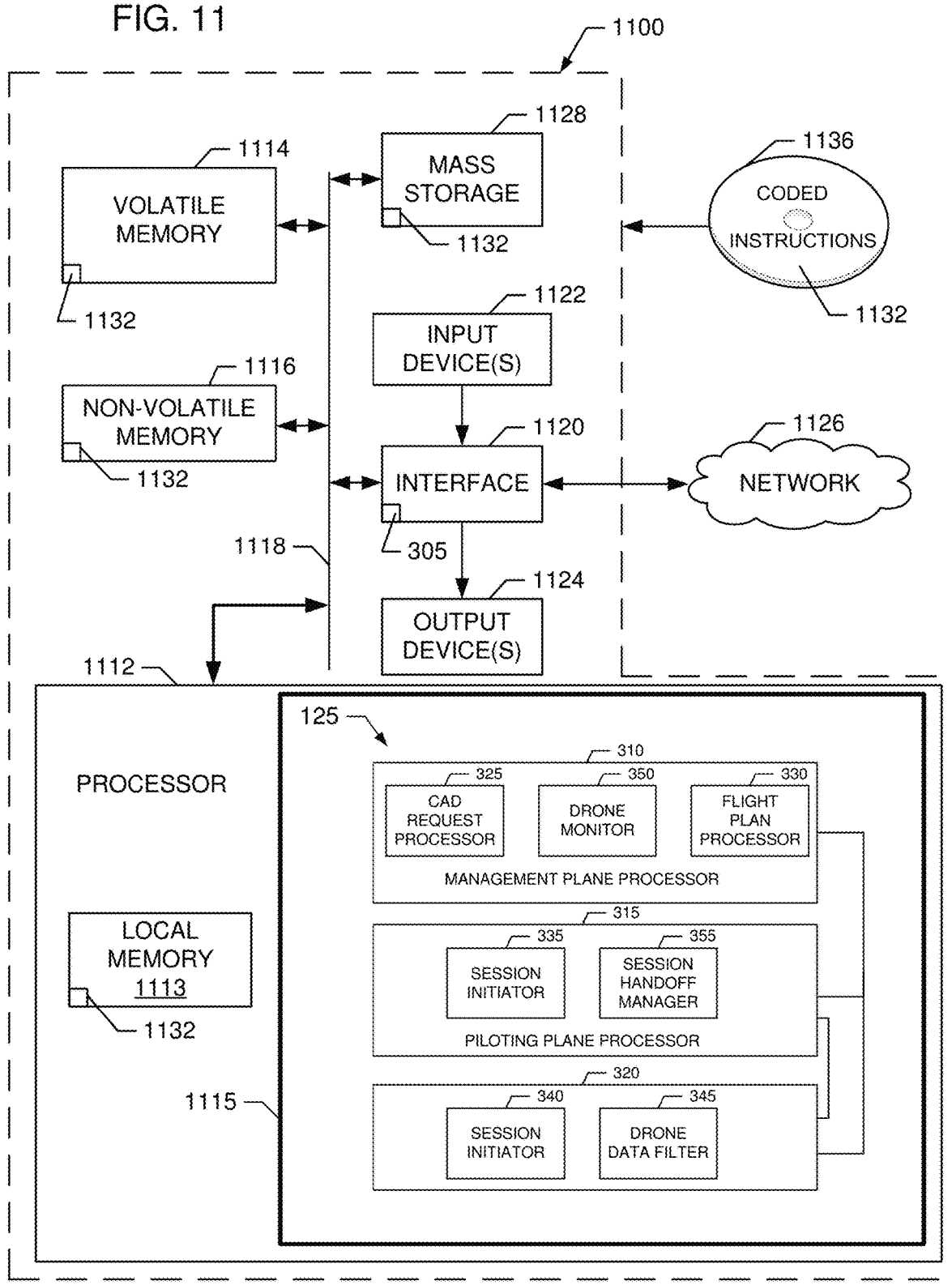
FIG. 11 is a block diagram of an example processor platform structured to execute the example machine readable instructions of FIGS. 7A-B and/or 8 to implement the example drone operations manager of FIG. 3.

At block 1045, the drone observation platform 135 determines whether deployment of the drone 105A has completed (e.g., such as when the drone 105A has been returned to its staging area). If drone deployment is not completed (block 1045), then processing returns to block 1025 to permit the drone observation platform 135 to exchanging data with the deployed drone 105A. However, if drone deployment has completed (block 1045), execution of the example program 1000 then ends FIG. 11 is a block diagram of an example processor platform 1100 capable of executing the instructions of FIGS. 7A-B and/or 8 to implement the example drone operations manager 125 of FIGS. 1, 3 and/or 4. The processor platform 1100 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 includes one or more example processing cores 1115 configured via example instructions 1132, which include the example instructions of FIGS. 7A-B and/or 8, to implement the example management plane processor 310, the example piloting plane processor 315, the example interaction plane processor 320, the example CAD request processor 325, the example flight plan processor 330, the example session initiator 335, the example session initiator 340, the example drone data filter 345, the example drone monitor 350 and/or the example session handoff manager 355 of FIG. 3.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.). In the illustrated example of FIG. 11, the interface circuit 1120 is also structured to implement the example network interface 305 of FIG. 3.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID (redundant array of independent disks) systems, and digital versatile disk (DVD) drives.

Coded instructions 1132 corresponding to the instructions of FIGS. 7A-B and/or 8 may be stored in the mass storage device 1128, in the volatile memory 1114, in the non-volatile memory 1116, in the local memory 1113 and/or on a removable tangible computer readable storage medium, such as a CD or DVD 1136.

Figure 12:
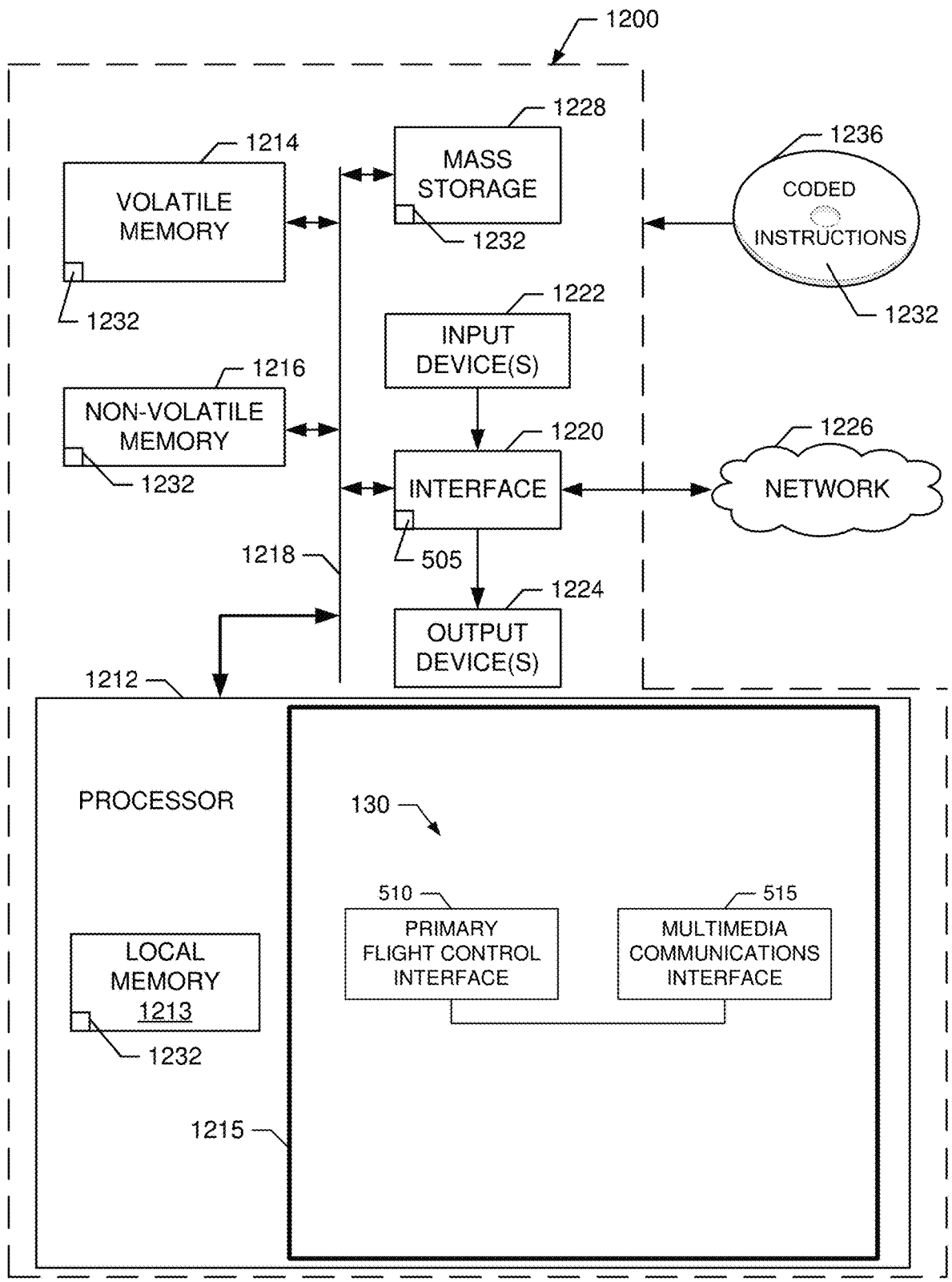
FIG. 12 is a block diagram of an example processor platform structured to execute the example machine readable instructions of FIG. 9 to implement the example flight control platform of FIG. 5.

FIG. 12 is a block diagram of an example processor platform 1200 capable of executing the instructions of FIG. 9 to implement the example flight control platform 130 of FIGS. 1, 4 and/or 5. The processor platform 1200 can be, for example, a server, a personal computer, a mobile device (e.g., a cell phone, a smart phone, a tablet such as an iPad™), a PDA, an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example of FIG. 12, the processor 1212 includes one or more example processing cores 1215 configured via example instructions 1232, which include the example instructions of FIG. 9, to implement the example primary flight control interface 510 and/or the example multimedia communications interface 515 of FIG. 5.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED display, an OLED display, a liquid crystal display, a CRT display, a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a DSL, a telephone line, coaxial cable, a cellular telephone system, etc.). In the illustrated example of FIG. 12, the interface circuit 1220 is also structured to implement the example network interface 505 of FIG. 5.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives.

Coded instructions 1232 corresponding to the instructions of FIG. 9 may be stored in the mass storage device 1228, in the volatile memory 1214, in the non-volatile memory 1216, in the local memory 1213 and/or on a removable tangible computer readable storage medium, such as a CD or DVD 1236.

Figure 13:
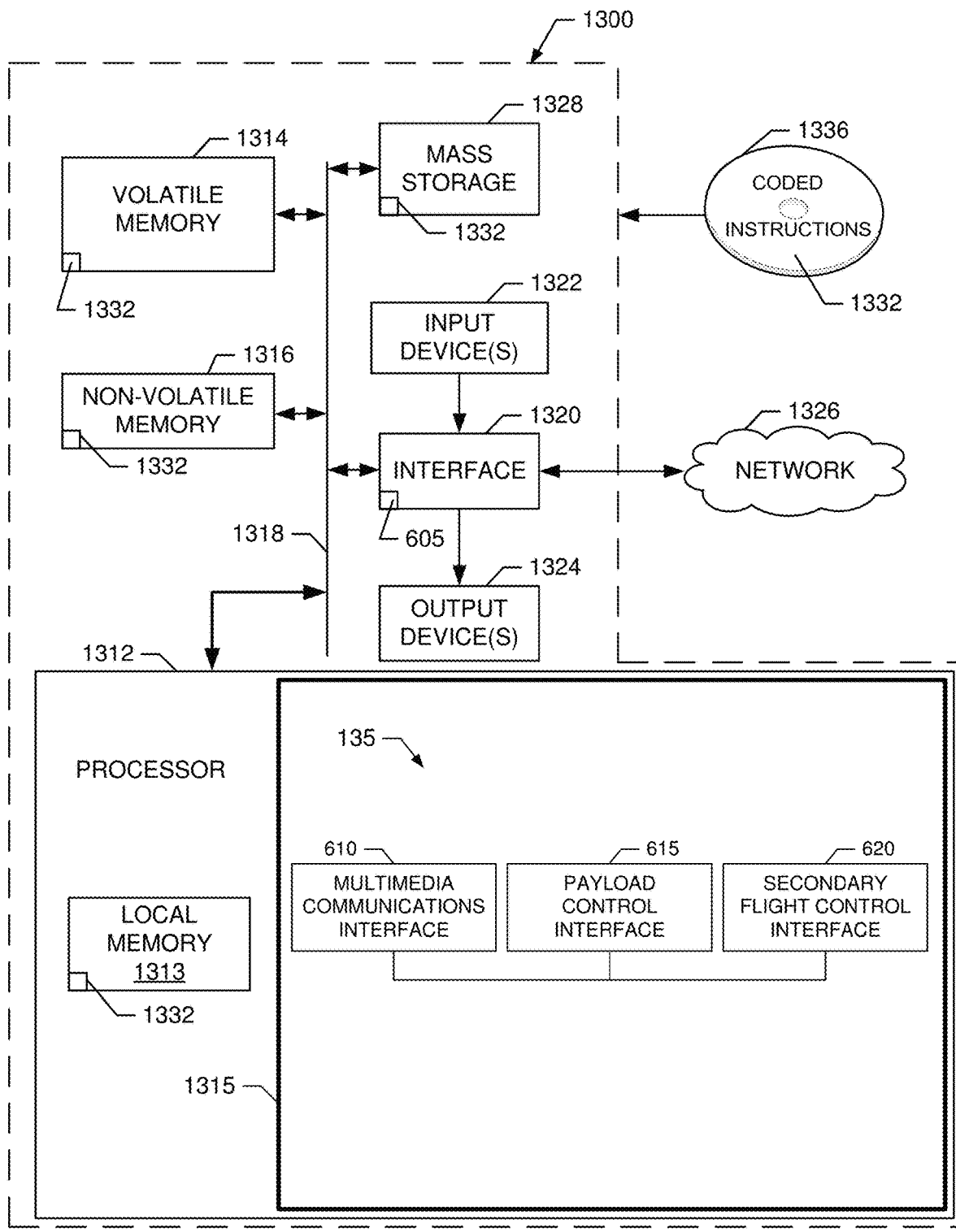
FIG. 13 is a block diagram of an example processor platform structured to execute the example machine readable instructions of FIG. 10 to implement the example drone observation platform of FIG. 6.

FIG. 13 is a block diagram of an example processor platform 1300 capable of executing the instructions of FIG. 10 to implement the example drone observation platforms 135 and/or 135A-C of FIGS. 1, 4 and/or 6. The processor platform 1300 can be, for example, a server, a personal computer, a mobile device (e.g., a cell phone, a smart phone, a tablet such as an iPad™), a PDA, an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example of FIG. 13, the processor 1312 includes one or more example processing cores 1315 configured via example instructions 1332, which include the example instructions of FIG. 10, to implement the example multimedia communications interface 610, the example payload control interface 615 and/or the example secondary flight control interface 620 of FIG. 6.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by SDRAM, DRAM, RDRAM and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a USB, and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., an LED display, an OLED display, a liquid crystal display, a CRT display, a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a DSL, a telephone line, coaxial cable, a cellular telephone system, etc.). In the illustrated example of FIG. 13, the interface circuit 1320 is also structured to implement the example network interface 605 of FIG. 6.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives.

Coded instructions 1332 corresponding to the instructions of FIG. 10 may be stored in the mass storage device 1328, in the volatile memory 1314, in the non-volatile memory 1316, in the local memory 1313 and/or on a removable tangible computer readable storage medium, such as a CD or DVD 1336.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method, comprising:
   receiving, by a system comprising a processor, message data from a flight control platform associated with a first operator identity;
   initiating, by the system, a first communication session between the flight control platform and drone equipment to permit remote piloting of the drone equipment;
   identifying, by the system, a drone observation platform associated with a second operator identity, wherein the identifying is based on qualification data associated with the second operator identity and descriptive information data representing service request data that is associated with a first location;
   initiating, by the system, a second communication session between the flight control platform and the drone observation platform; and
   dispatching, by the system, the drone equipment to the first location based on a flight plan by remotely piloting the drone equipment using the first communication session.

2. The method of claim 1, further comprising:
   initiating, by the system, a third communication session between the drone observation platform and the drone equipment to exchange sensor data between the drone observation platform and the drone equipment.

3. The method of claim 2, further comprising:
   blocking, by the system, data from being exchanged between the drone observation platform and the drone equipment via the third communication session to prevent the remote piloting of the drone equipment via the drone observation platform.

4. The method of claim 3, further comprising:
activating, by the system, the blocking of the data from being exchanged between the drone observation platform and the drone equipment via the third communication session based on command data received from the flight control platform.

5. The method of claim 1, further comprising:
adding, by the system, communication equipment to the second communication session, wherein the communication equipment exchanges data between the communication equipment and the flight control platform.

6. The method of claim 1, wherein data exchanged between the flight control platform and the drone observation platform via the second communication session comprises:
voice data exchanged between the flight control platform and the drone observation platform; and
graphical data transmitted from the flight control platform to the drone observation platform, wherein the graphical data is based on sensor data received by the flight control platform from the drone equipment via the first communication session.

7. The method of claim 1, wherein the drone equipment is a first drone equipment of a group of drone equipment, the first drone equipment is located at a second location, further comprising:
receiving, by the system, the service request data from a computer aided dispatch system, the service request data identifying the first location and comprising the descriptive information data;
identifying, by the system, the first drone equipment from the group of drone equipment based on the descriptive information data and a distance between the first location and the second location; and
initiating, by the system, a mapping application to determine the flight plan to route the first drone equipment from the second location to the first location.

8. The method of claim 1, wherein the first operator identity and the second operator identity are at different locations.

9. The method of claim 1, further comprising:
in response to receiving the message data from the flight control platform indicating the flight plan is approved, transmitting, by the system, the flight plan to a computing platform associated with a governmental agency or a regulating body.

10. A non-transitory computer readable storage medium comprising computer readable instructions that, when executed, cause a processor to perform operations comprising:
receiving message data from a flight control platform associated with a first operator identity;
initiating a first communication session between the flight control platform and drone equipment to permit remote piloting of the drone equipment;
identifying a drone observation platform associated with a second operator identity, wherein the identifying is based on qualification data associated with the second operator identity and descriptive information data representing service request data that is associated with a first location;
initiating a second communication session between the flight control platform and the drone observation platform; and
sending the drone equipment to the first location based on a flight plan by remotely piloting the drone equipment using the first communication session.

11. The non-transitory computer readable storage medium of claim 10, wherein the operations further comprise:
initiating a third communication session between the drone observation platform and the drone equipment, wherein the third communication session is used to exchange control data between the drone observation platform and the drone equipment.

12. The non-transitory computer readable storage medium of claim 11, wherein the operations further comprise:
preventing data from being exchanged between the drone observation platform and the drone equipment via the third communication session, wherein the preventing of the data from being exchanged inhibits the remote piloting of the drone equipment via the drone observation platform.

13. The non-transitory computer readable storage medium of claim 10, wherein the operations further comprise:
adding a communication device to the second communication session to exchange data between the communication device and the drone observation platform.

14. The non-transitory computer readable storage medium of claim 10, wherein data exchanged between the flight control platform and the drone observation platform via the second communication session comprises:
graphical data transmitted from the flight control platform to the drone observation platform, wherein the graphical data is based on sensor data received by the flight control platform from the drone equipment via the first communication session.

15. The non-transitory computer readable storage medium of claim 10, wherein the first operator identity and the second operator identity are at different geographical locations.

16. A system, comprising:
a processor; and
a memory that stores executable instructions that, when executed by the processor, facilitate performance of operations, comprising:
receiving message data from a control platform associated with a first operator identity;
starting a first communication session between the control platform and a drone to allow remote piloting of the drone;
selecting an observation platform associated with a second operator identity, wherein the selecting is based on qualification data associated with the second operator identity and service request data that is associated with a first location;
starting a second communication session between the control platform and the observation platform; and
dispatching the drone to the first location based on a flight plan by remotely piloting the drone using the first communication session.

17. The system of claim 16, wherein the operations further comprise:
starting a third communication session between the observation platform and the drone, and exchanging, via the third communication session, sensor data or control data between the observation platform and the drone.

18. The system of claim 17, wherein the operations further comprise:
blocking data from being exchanged between the observation platform and the drone via the third communication session to prevent the remote piloting of the drone via the observation platform.

19. The system of claim 16, wherein the operations further comprise: adding a communication device to the second communication session and exchanging data between the communication device and the control platform or the observation platform.

20. The system of claim 16, wherein the first operator identity and the second operator identity are not geographically proximate.

* * * * *